(12) United States Patent
Pereyra-Garcia Bustamante et al.

(10) Patent No.: US 11,407,252 B2
(45) Date of Patent: Aug. 9, 2022

(54) TRIM ON AN AUTOMOBILE WHEEL RIM

(71) Applicant: DEMMEL AG, Scheidegg (DE)

(72) Inventors: Daniel Miguel Pereyra-Garcia Bustamante, Lindenberg (DE); Marek Stietenroth, Scheidegg (DE)

(73) Assignee: DEMMEL AG, Scheidegg (DE)

( * ) Notice: Subject to any disclaimer, the term of this patent is extended or adjusted under 35 U.S.C. 154(b) by 426 days.

(21) Appl. No.: 16/271,434

(22) Filed: Feb. 8, 2019

(65) Prior Publication Data

US 2019/0344612 A1    Nov. 14, 2019

(30) Foreign Application Priority Data

Feb. 9, 2018   (DE) .......................... 102018102904.7
Apr. 6, 2018   (DE) .......................... 102018108149.9

(51) Int. Cl.
  *B60B 7/06*   (2006.01)
  *B60B 7/12*   (2006.01)
  *B60B 7/04*   (2006.01)

(52) U.S. Cl.
  CPC .............. *B60B 7/065* (2013.01); *B60B 7/063* (2013.01); *B60B 7/12* (2013.01); *B60B 7/04* (2013.01)

(58) Field of Classification Search
  CPC ........... B60B 7/06; B60B 7/061; B60B 7/065; B60B 7/063; B60B 7/12; B60B 7/10; B60B 7/04
  See application file for complete search history.

(56) References Cited

U.S. PATENT DOCUMENTS

| | | | |
|---|---|---|---|
| 1,329,935 A * | 2/1920 | Smith | B60B 7/10 74/609 |
| 5,803,552 A | 9/1998 | Kato et al. | |
| 8,382,211 B2 | 2/2013 | Renius et al. | |
| 2008/0136247 A1* | 6/2008 | Janty | B60B 7/0066 301/37.104 |
| 2011/0101766 A1 | 5/2011 | Chinavare et al. | |
| 2018/0056714 A1* | 3/2018 | Maji | B60B 7/08 |
| 2020/0047547 A1* | 2/2020 | Pereyra-Garcia Bustamante | B60B 7/0033 |
| 2020/0254923 A1* | 8/2020 | Pereyra-Garcia Bustamante | B60B 7/006 |

FOREIGN PATENT DOCUMENTS

| | | |
|---|---|---|
| DE | 29719120 U1 | 2/1998 |
| DE | 102011107064 | 3/2012 |
| DE | 102011114664 | 4/2012 |
| DE | 102015206831 | 10/2016 |
| DE | 102016013286 | 5/2017 |

* cited by examiner

*Primary Examiner* — Jason R Bellinger
(74) *Attorney, Agent, or Firm* — Faegre Drinker Biddle & Reath LLP

(57) ABSTRACT

A decorative trim panel on an automobile rim composed of at least one plate-shaped trim element that at least partially covers the visible side of the automobile rim, which can be secured by retaining means on the spokes of the rim, wherein a fastening plate bears on the back surface of the at least one spoke in a load transferring manner, and can be attached to the trim element in each case via retaining connections.

15 Claims, 18 Drawing Sheets

TRIM ON AN AUTOMOBILE WHEEL RIM

CROSS-REFERENCE TO RELATED APPLICATION(S)

The present application claims priority to DE 102018102904.7, filed Feb. 9, 2018, and DE102018108149.9, filed Apr. 6, 2018, the entire disclosures of both of which are hereby expressly incorporated herein by reference.

BACKGROUND/SUMMARY OF THE DISCLOSURE

The subject matter of the present invention is a trim element on an automobile wheel.

Such a trim element is disclosed in US 2011/0101766 A1, in which the trim element comprises a disk-shaped decorative panel that is attached to two dedicated recesses in the respective spokes of the automobile wheel using two retaining plates that can be interconnected. The first retaining plate is inserted through radial slots in the decorative panel from the front and wedged into radial slots in the wheel lying behind them, wherein the slots in the wheel must be flush with the slot in the decorative panel. The second retaining plate is placed on the decorative panel, passes through the radial slot in the decorative panel, and is connected to the second retaining plate wedged into the slot in the wheel.

The wedging of the first retaining plate in the slot in the wheel cannot accommodate large forces and is susceptible to moisture and dirt.

A further disadvantage is that it is not possible to attach a trim element comprised of numerous segments, e.g. numerous segmented decorative panels extending along the circumference, which have no circumferential connections on their undersurfaces.

A further disadvantage of the known attachment system for a trim panel on an automobile wheel is that the production tolerances in producing the wheel result in a reciprocal offset of the slots in the wheel that cannot be controlled with the type of attachment depicted therein.

In particular, it may be the case that the radial slots in the disk-shaped trim element are not precisely flush with the dedicated radial slots in the spokes of the automobile wheel, such that the retaining elements that are used cannot be connected, thus attaching the trim panel to the wheel.

Another automobile wheel is known from DE 10 2015 206 831 A1, in which a disk element is screwed onto a wheel ring, and the disk element is overlaid with additional decorative elements that are substantially circular and have only simple retaining pins, which are intended to engage in dedicated retaining holes in the disk element.

This is also accompanied by the problem that it is not possible to adjust the retaining connection because the retaining pins must be precisely flush with the opposing disk element of the wheel, such that it is otherwise impossible to attach these elements.

The object of the invention is therefore to attach a trim element of the type specified in the introduction, preferably in the form of a circular panel, to the front or visible surface of an automobile wheel such that the tolerances of the wheel no longer affect the attachment of the trim element.

Accordingly, one feature of the invention is that in each case, a fastening plate bears on the back surface of the at least one spoke in a load transferring manner, and can be connected at the edge to the trim element. As a result, there is the advantage that the back surface of the spoke is only used as a load bearing surface, without the need for holes, projections, or slots for transferring loads.

As a result, the load transfer takes place on the entire back surface of the spoke, and the load bearing surface is not directed toward isolated attachment points, as is the case with the prior art.

Accordingly, a fastening plate is located on the back surfaces of the spokes of the automobile wheel, which spans at least the space between two adjacent spokes, and forms a retaining connection in each case to a mount located on the trim element acting along the circumference.

It is preferred that these retaining connections acting along the circumference are obtained with a retaining slider that can be displaced and locked in place along the circumference of the fastening plate, which engages at its free end in a lateral retaining connection to the mount formed on the undersurface of the trim element.

This results in the advantage that by displacing the retaining slider, which is retained in dedicated slider tracks on the surface of the fastening plate such that it can be displaced and locked in place therein, the decorative panel can be locked in place on the undersurface of the spoke.

Depending on how the respective retaining slider is displaced along the circumference of the wheel on the fastening plate, the retaining slider pushes the mount, which is more or less longitudinally flexible, under the undersurface of the respective spoke of the automobile wheel, in order to thus compensate for any play between the attachment of the trim element and the fastening elements on the wheel.

This therefore comprises a retaining connection that can be tightened without tools, which compensates for the production tolerances of automobile wheels and the connecting spokes therein with respect to the fastening elements on the trim, in that lateral retaining mounts are located on the undersurfaces of the respective trim elements, which engage behind the respective spokes on at least one side, and bears on a dedicated stop surface on the undersurface of the spoke.

The aforementioned retaining sliders are used to stabilize and secure this stop surface on the undersurface of the spoke, which can be displaced on the fastening plate located beneath the spokes in one direction, wherein the base of the retaining slider is tightened down in a retaining manner in a dedicated fastening groove, and forms a tensioning arm with its free arm, which is longitudinally flexible and has a retaining hole in the middle.

The tensioning slider can therefore be pushed against the mount on the undersurface of the trim element because of the fluked retaining connection acting in only one direction, which locks in place in the other direction, and presses it tightly, with a slight bending thereof, with its bearing surface against the undersurface of the spoke.

As a result, any production tolerances between the spokes can be compensated for by the retaining slider that can be displaced and locked in place along the circumference.

In a preferred exemplary embodiment, the invention distinguishes between large surface first trim elements and smaller trim elements that have smaller covering surfaces.

The larger, basically curved, trim elements also have a retaining connection in the middle, in the space between opposing spokes facing the underlying fastening plate.

Such a retaining connection is not necessarily needed for the smaller trim elements, which can likewise be secured in smaller spaces in the wheel.

In a preferred embodiment, the larger and smaller trim elements are made of plastic, and the aforementioned mount is formed in an integral manner on the back surfaces of these plastic elements.

The invention is not limited thereto.

The retaining mounts can also be attached in another manner to the plate-shaped trim elements, e.g. via releasable fasteners, such as screws, clamps or rivets, or via other material bonded connections, e.g. adhesives, joints or welds.

The trim elements can also be made of any material, e.g. plastic, glass, metal, wood, or metal/plastic composites, or wood/plastic composites.

The specified retaining slider, which can be displaced in dedicated retaining tracks in the region of the lower fastening plate, and only lock in place in one direction, preferably function with retaining ribs in the form of flukes, that only allow movement in one direction, such that movement in the other direction is blocked.

Instead of retaining tracks with dedicated retaining ribs, each of which have guide grooves, other longitudinal guides can, as a matter of course, be used according to the present invention.

Such a longitudinal guide can also comprise other tightening means instead of the retaining ribs that engage in a fluked manner in dedicated, opposing retaining grooves, e.g. eccentric clamping levers or the like.

As explained in the introduction, the assembly requires no tools, and geometric modifications to the wheel are not necessary, i.e. this comprises a "plug & play" process.

For the assembly, the larger trim elements are first inserted in the spaces. The fastening plate is then inserted into the space between the spokes from below, and the large trim element is subsequently secured to the fastening plate with the retaining connections.

After the fastening plate has been inserted from below, the smaller trim element is placed on the other side thereof on the space between the spokes of the automobile wheel from the front, and secured to the dedicated retaining hooks of the fastening plate.

This requires that the retaining slider is already secured in the retaining tracks on the fastening plate in a specific preassembled state, and if there are any production tolerances in the automobile wheel, and the spacings between the spokes are no longer uniform, the retaining slider can then be displaced along the circumference of the automobile wheel, such that retaining hooks of the trim element bearing on the undersurfaces of the spokes then press with an additional tensioning force against the spokes in the wheel due to the tensioning arms of the retaining slider bearing on the retaining mounts.

This comprises an assembly requiring no tools, which can be assembled particularly easily, and in which any radial and circumferential tolerances between the spokes of an automobile wheel can be compensated for with regard to the attachment of the decorative trim element.

In a further development of the invention, so-called locking sliders are used for radially securing the retaining connection between the trim elements on the front and the fastening plates on the back obtained in this manner, which then act against the centrifugal forces acting on the overall assembly, because such a locking slider is basically T-shaped, and the T-shape cross bar bears in a load transferring manner on the flange of the wheel, and engages behind the internal fastening plate with its retaining hooks located on the free end of the T-leg, thus securing it in place.

A locking slider is not necessary in all of the embodiments, as other securing measures can also be applied to the spokes themselves.

In another embodiment of the present invention, another design of a novel retaining connection is claimed, in which the fastening plate 12 described comprehensively above in accordance with FIGS. 1 to 21 is entirely eliminated, and is replace instead with a novel retaining connection, which can be adjusted vertically with respect to the plane of the trim element, and is substantially comprised of two opposing support mounts forming a conical retaining gap, between which a retaining connection is formed with a retaining slider that can only be displaced in one direction—which can be displaced in this conical retaining gap—such that the retaining slider is retained on the whole such that it can be adjusted vertically, in a direction perpendicular to the plane of the trim element, this being only in the one direction, toward the plane, but not away therefrom.

This displacement in only one direction, which tightens the retaining connection, is obtained through fluked plates that are oriented accordingly, such that the retaining slider in the retaining gap can only be displaced and secured in the one direction, this being the direction perpendicular to the plane of the trim element.

It is advantageous that the retaining slider itself has a socket or some other type of attachment for receiving a locking slider therein, which preferably bears on the back surfaces of the spokes of the motor vehicle wheel in a load transferring manner. As a result, the retaining slider serves a double function, specifically to stabilize the retaining force of the support mount and also to form the receiver for the locking slider bearing on the wheel in a load transferring manner.

As a result, an entirely novel and simplified retaining attachment of the trim element according to the invention to a motor vehicle wheel is obtained, because the counter-plate can then be eliminated, and by tightening the locking slider in the retaining gap that can be adjusted vertically, this retaining connection can be readjusted in a force transferring manner, in order to tighten the trim element to the motor vehicle wheel.

It is particularly advantageous when the retaining gap is conical and lies in the region between the lateral retaining mount serving for retention, because the tightening of the lateral retaining mounts that can be attached to the wheel can also be adjusted therewith. The deeper the retaining slider is inserted into the conical retaining gap toward the plane of the underlying trim element, the more it is tightened against the respective retaining mount, such that it is pressed (or bent) further radially outward, thus improving the retaining connection to the wheel.

This comprises a double effect through the placement of a retaining gap in the region behind the lateral retaining mounts, which is achieved in that a retaining gap is formed at a spacing to the lateral retaining mount, directly behind which there are further counter retainers—attached to the trim element—in the form of hooks that can be secured from one side, which form fluked plates on their inner surface, in which the aforementioned retaining slider engages with a dedicated fluke plate, and can only be displaced downward therein toward the plane of the trim element, but is blocked in the opposite direction, upward, and remains there such that it cannot be displaced.

In another embodiment, which is not illustrated, it should be noted that the locking slider, which bears in a load transferring manner on the back surfaces of the spokes, does not necessarily need to be located in the region of a retaining connection between the lateral retaining mounts. The retaining connection can also be formed outside the retaining mounts in another region of the trim element by placing other retaining elements thereon.

For purposes of simplicity, and for structural reasons, the double function of the lateral retaining mounts is preferred, however, which serve to retain the trim element on the wheel, and also form a retaining gap in conjunction with the counter retainers lying behind it, in that the locking slider is received such that it can be displaced in one direction, and bears on the back surfaces of the spokes in a force transferring manner.

The locking sliders referred to as a locking sliders in the exemplary embodiments according to FIGS. 1 to 21 also exist in the other exemplary embodiments according to FIGS. 22 to 31 with the same function, but are shaped somewhat differently in order to obtain a better force transferring bearing on the back surfaces of the spokes of a motor vehicle wheel.

It should also be noted that the invention does not necessarily relate to the placement of the locking slider in the two embodiments (FIGS. 1 to 21 and FIGS. 22 to 31), because the locking sliders can be entirely eliminated and the sole retaining connection would then be formed by the supporting mounts illustrated in the drawing in FIG. 27, which likewise have retaining heads with which the trim element can be suspended on a suitable counter-surface on the back surfaces of the motor vehicle wheel spokes.

The invention is therefore not limited to the presence of locking sliders. Such an embodiment, with locking sliders, is preferred, however.

The subject matter of the present invention can be derived not only from the subject matter of the individual claims, but also from combinations of the individual claims.

All of the information and features disclosed in the documents, including the abstract, in particular the spatial design illustrated in the drawings, are claimed as substantial to the invention, as long as they are novel over the prior art, individually or in combinations thereof.

The invention shall be explained in greater detail below based on drawings illustrating just one embodiment. Further features and advantages substantial to the invention can be derived from the drawings and the descriptions thereof.

BRIEF DESCRIPTION OF THE DRAWINGS

Therein.

DETAILED DESCRIPTION OF EXEMPLARY EMBODIMENTS

Figure 1:
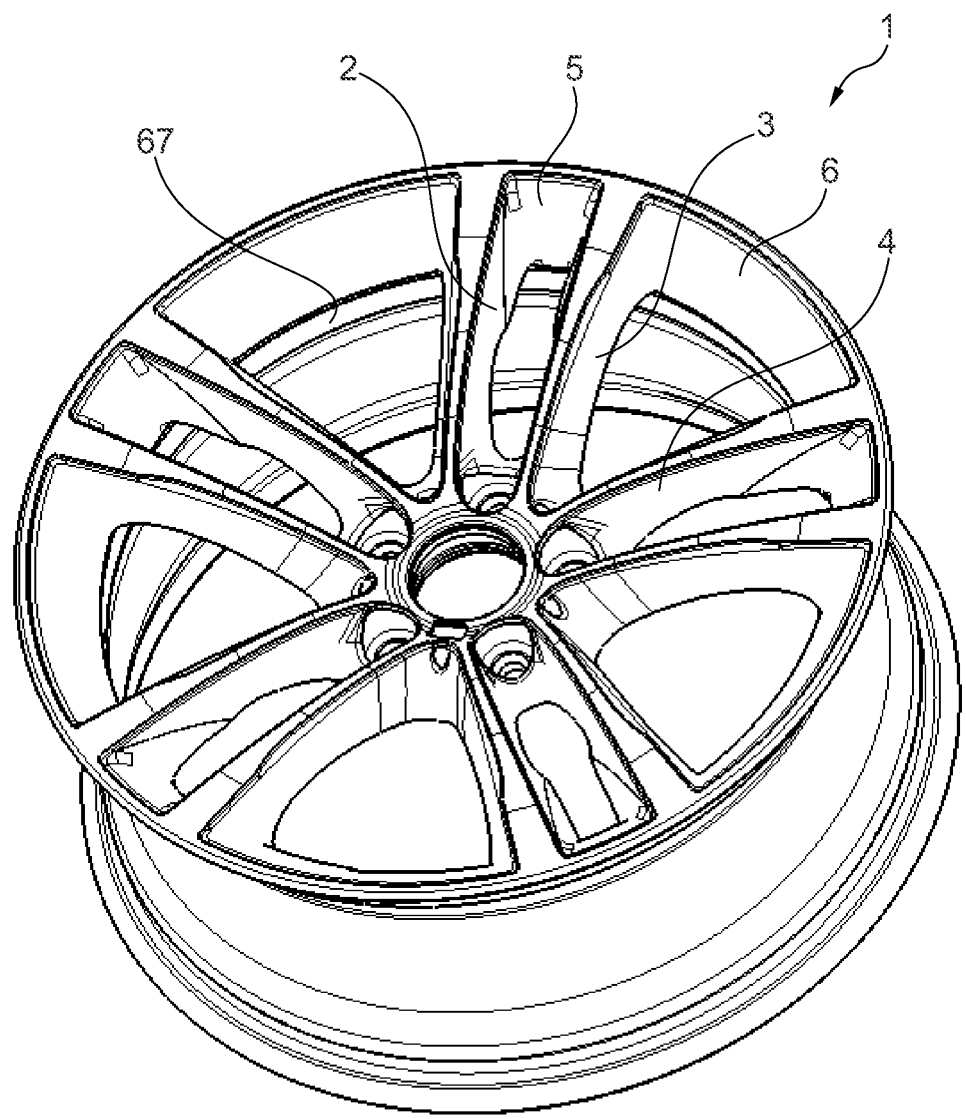
FIG. 1: shows a perspective illustration of an automobile wheel in the form of a casted wheel.

An automobile wheel 1 in the form of a cast wheel is illustrated in FIG. 1, to which the invention is not limited. Instead of a cast wheel, welded wheels or any other wheel construction belonging to the prior art can also be used.

In any case, a cast wheel is illustrated in FIG. 1, composed of a series of spokes 2, 3, 4 distributed along the circumference, forming a smaller space 5 and a larger space 6 between them in each case.

The object of the invention is to attach the trim elements 9, 10 in the spaces 5, 6 of the wheel 1 such that they can also withstand high centrifugal forces, can be installed without tools, can be easily installed in a plug-in process, and can also withstand high levels of contamination, cold temperatures and other harmful environmental effects, without becoming dislodged.

Figure 2:
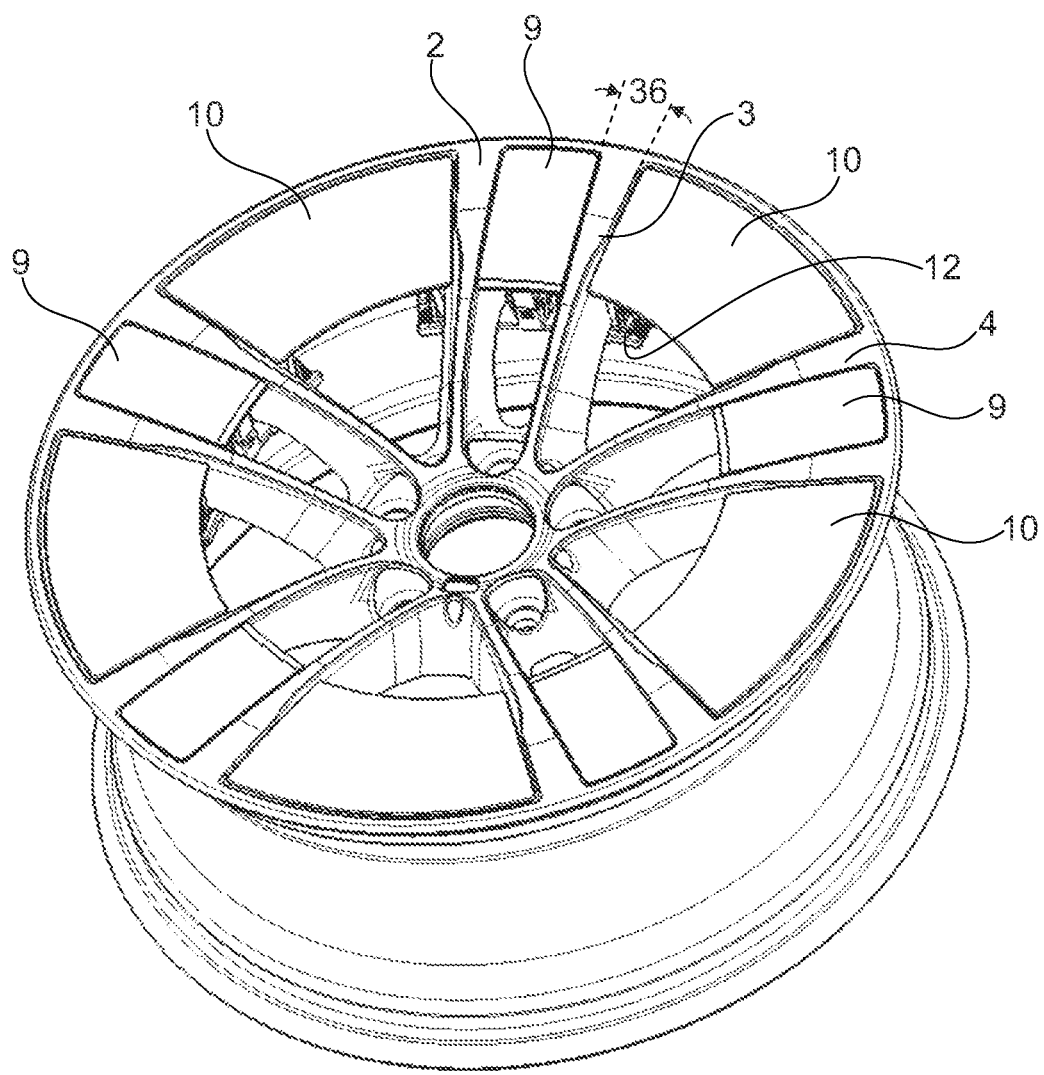
FIG. 2: shows the wheel according to FIG. 1, covered on the visible side by the trim elements according to the invention, which form a circumferential segmented annular panel.

This object is achieved according to the features shown in FIG. 2, where it can be seen that smaller trim elements 9 cover the smaller spaces 5 between the spokes 2, 3, at least radially outward from the middle of the wheel 1, while the larger segmented trim elements 10 cover the larger spaces 6 between the spokes 2, 3, 4 in segments in the wheel 1.

Segmented fastening plates 12 are located opposite these trim elements in the interior space of the automobile wheel, extending longitudinally along the circumference of the wheel 1, each of which retain the trim elements 9, 10 on the front at their edges with load transferring retaining connections 63, 64.

The invention is not limited to the positioning of smaller trim elements 9 and larger trim elements 10. It may be the case that there are only smaller trim elements 9 or only larger trim elements 10.

Likewise, the trim elements 9, 10 do not have to be in the shape of arc segments; they can also have other shapes, e.g. rectangular, and they can be segmented, and they can support lighting elements, etc.

Figure 3:
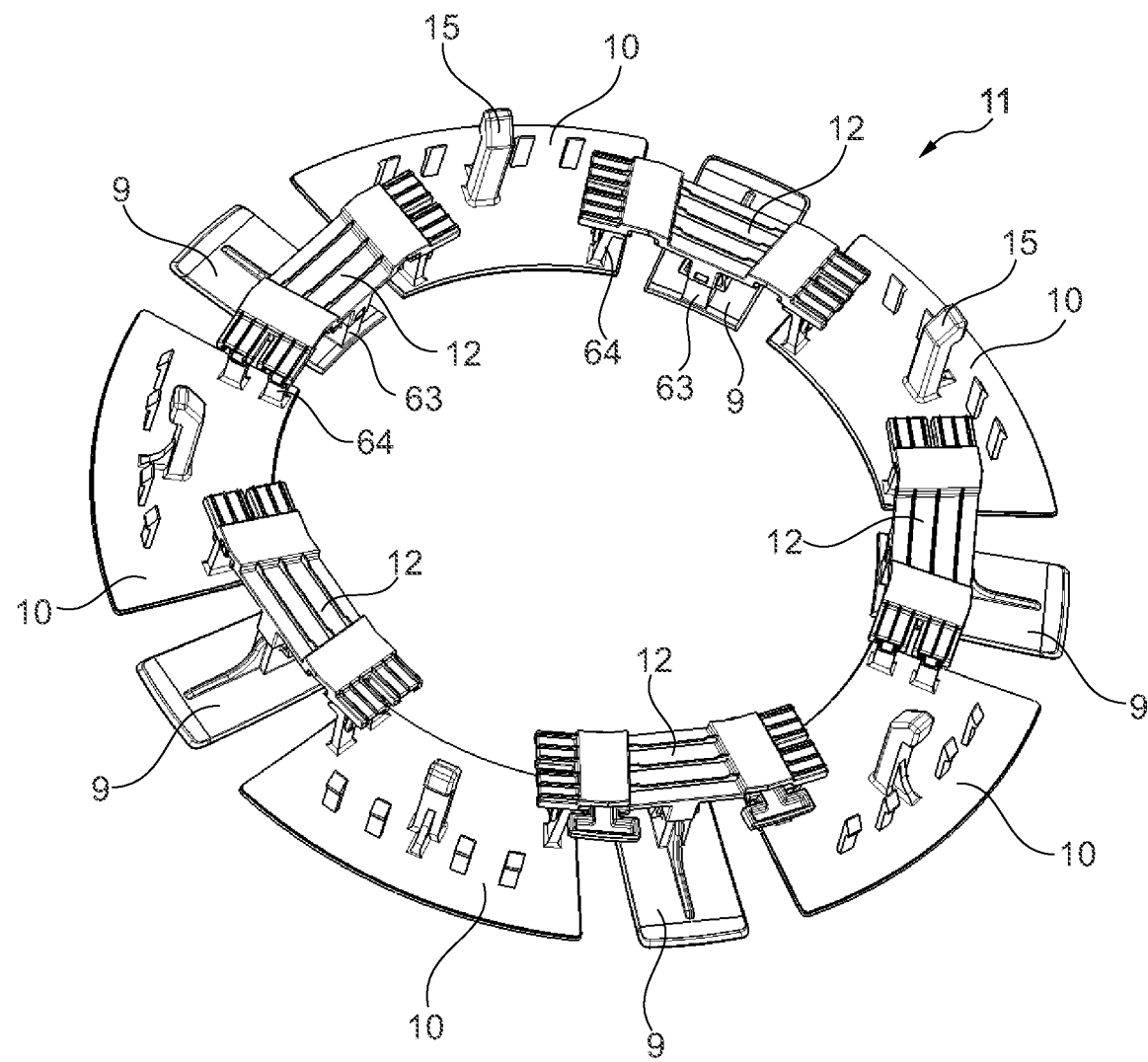
FIG. 3: shows the annular panel according to FIG. 2 from behind, in the assembled state.

FIG. 3 shows the back surface of the segmented annular panels 11, composed of the smaller and larger trim elements 9, 10, where it can be seen that the respective trim elements 9, 10 are connected at the edges by appropriate retaining connections 64 to a fastening plate 12 bearing on the back surfaces of the spokes 2, such that a number of fastening plates 12 extend uniformly along the circumference of the wheel, wherein the fastening plates 12 bear on the back surfaces of the spokes 2, 3 in a load transferring, planar manner, while the trim elements 9, 10 bear on the surfaces of the spokes 2-4.

The advantage with the invention is that the spokes 2-4 themselves are not clamped, i.e. they are not clamped laterally by the trim elements and the corresponding fastening means, and instead engage behind the trim elements with corresponding retaining mounts 14 on the spokes 2-4, such that a certain amount of play arising along the circumference can be compensated for that would not be able to be compensated for with the other means provided by the prior art. Accordingly, spot attachment to the spokes of the wheel 1 is not needed, and instead, a planar, load transferring retaining connection 63, 64 between the trim elements 9, 10 located on the front surface of the wheel 1 and the fastening plates 12 engaging behind the spokes 2-4 is obtained.

As a result, the invention makes it possible for the first time to span a spacing, resulting from production tolerances, over the circumference between the spokes 2, 3, with the novel tensioned retaining connection of the trim elements 9, 10 according to the invention.

As a result, there is no direct and spot tensioning of the spokes 2-4, as is the case with the prior art, but instead, merely an engagement behind the respective spokes 2-4 by the corresponding retaining mounts 14 on the trim elements 9, 10, which bear on the undersurfaces of the respective spokes 2, 4 with bearing surfaces 59, as shall be explained below based on FIG. 21.

Figure 4:
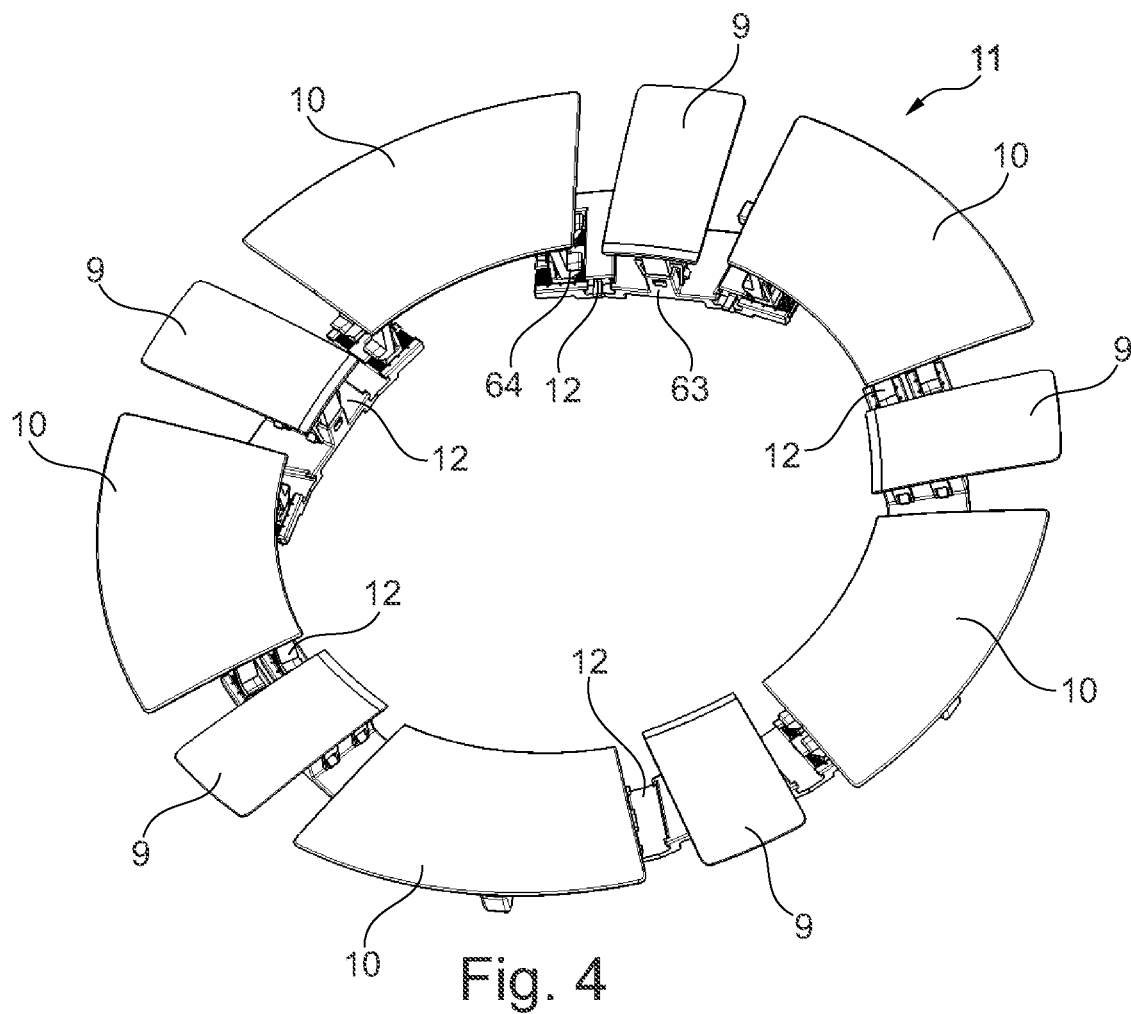
FIG. 4: shows a perspective view of the annular panel according to FIG. 3, seen from above.

The front surface of the annular, segmented annular panel 11 is shown in FIG. 4, where it can be seen that the fastening plates 12 that bear on the back surfaces of the spokes 2, 3 each span the spaces 5, 6 between the spokes 2, 3 and that a smaller trim element 9 is attached there in each case, in the middle of the fastening plate 12 by a simple retaining connection 63, while the lateral (near the edges) attachment of the larger trim elements 10 adjoining the fastening plates 12 laterally, is obtained by means of a retaining connection 64 secured along the circumference by means of retaining sliders 40.

Figure 5:
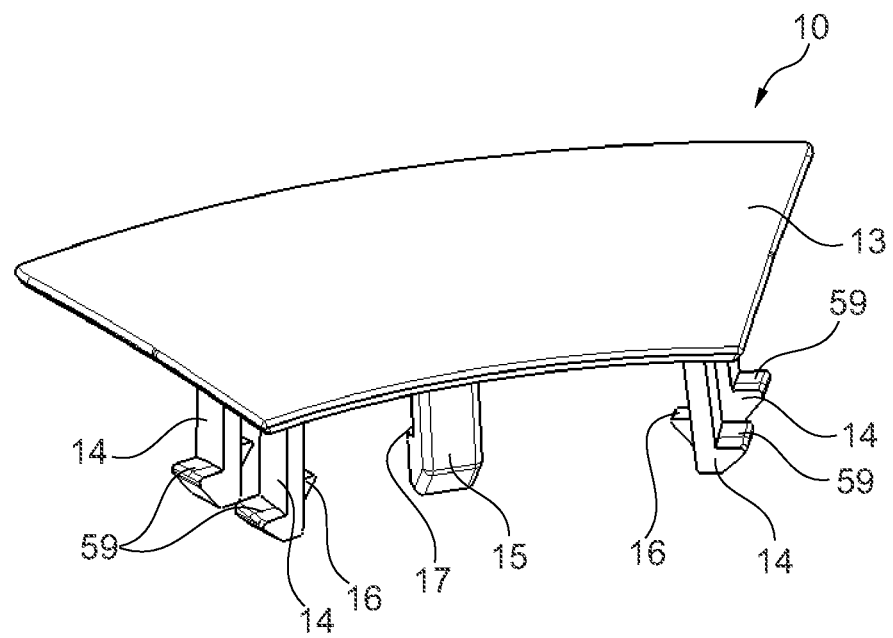
FIG. 5: shows a detailed view of the larger trim element.
Figure 6:
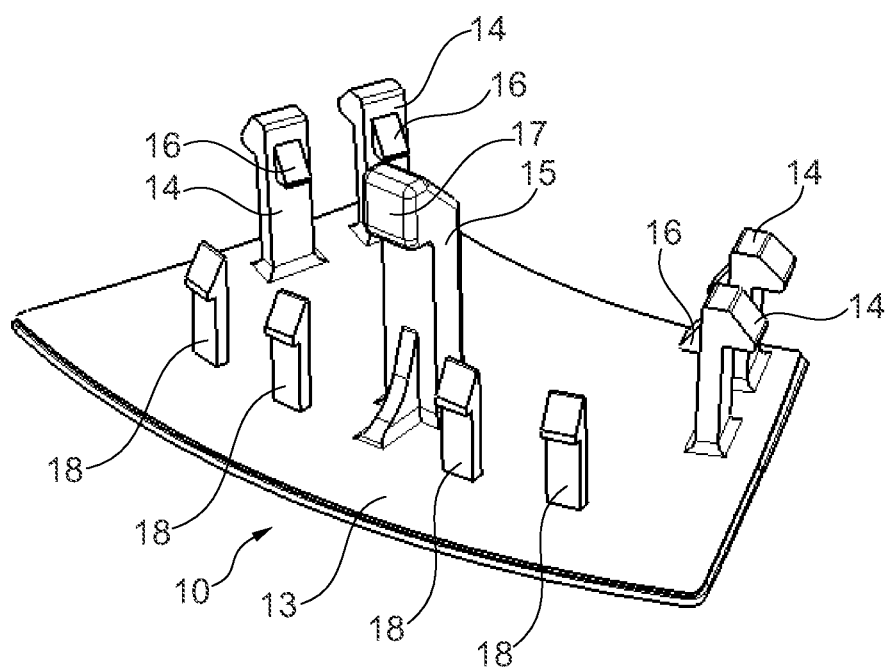
FIG. 6: shows the trim element according to FIG. 5 from behind.

FIG. 5 shows a perspective view of such a larger trim element 10 in conjunction with FIG. 6. It can be seen therein that there are retaining mounts 14 pointing outward on the lateral edges of the undersurfaces of the trim elements 10, which have retaining hooks that form dedicated stop surfaces 59 on their upper surfaces.

For a further fastening of the larger trim elements 10, there is also a further retaining mount 15 in the middle, which bears on a stop surface 17 on the flange 67 of the wheel.

The sides of the retaining mounts 14 facing inward have retaining lugs 16, the function of which shall be explained below.

The components shown in FIG. 5 are shown in another perspective in FIG. 6.

Figure 7:
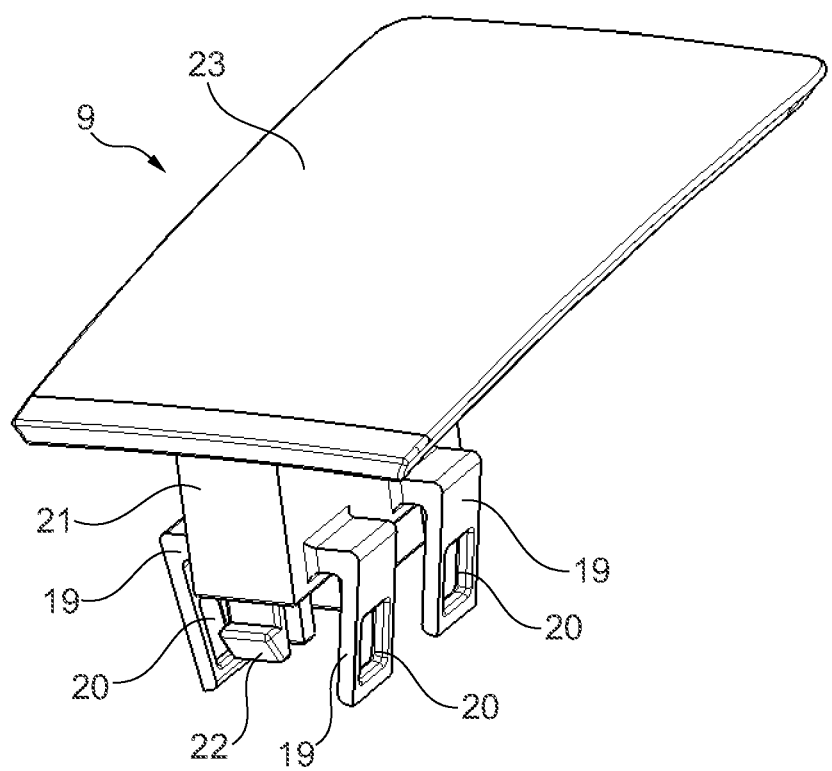
FIG. 7: shows a perspective view of the smaller trim element.

FIG. 7 shows the construction of a smaller trim element 9, which does not have the middle retaining mount 15 because it is not needed for the smaller trim elements.

Figure 8:
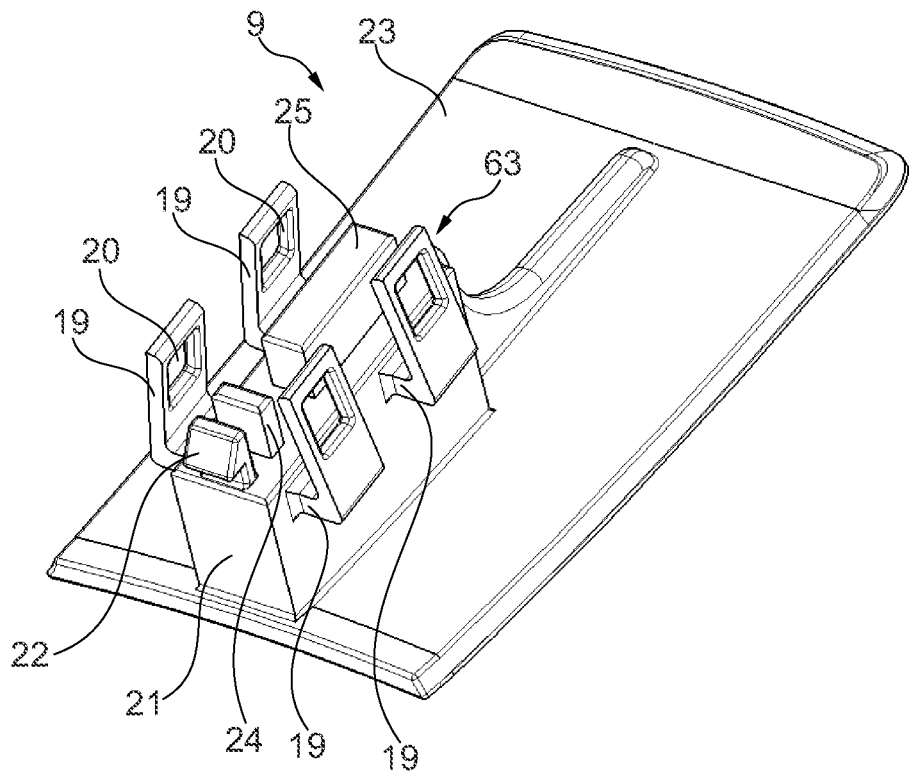
FIG. 8: shows the back surface of the smaller trim element in a perspective view.

A fastening element 21 is formed on the back surface of the trim element 9, as shown in FIGS. 7 and 8, which has a retaining mount 22 with a dedicated retaining hook formed on its lateral surface, facing along the circumference.

Figure 14:
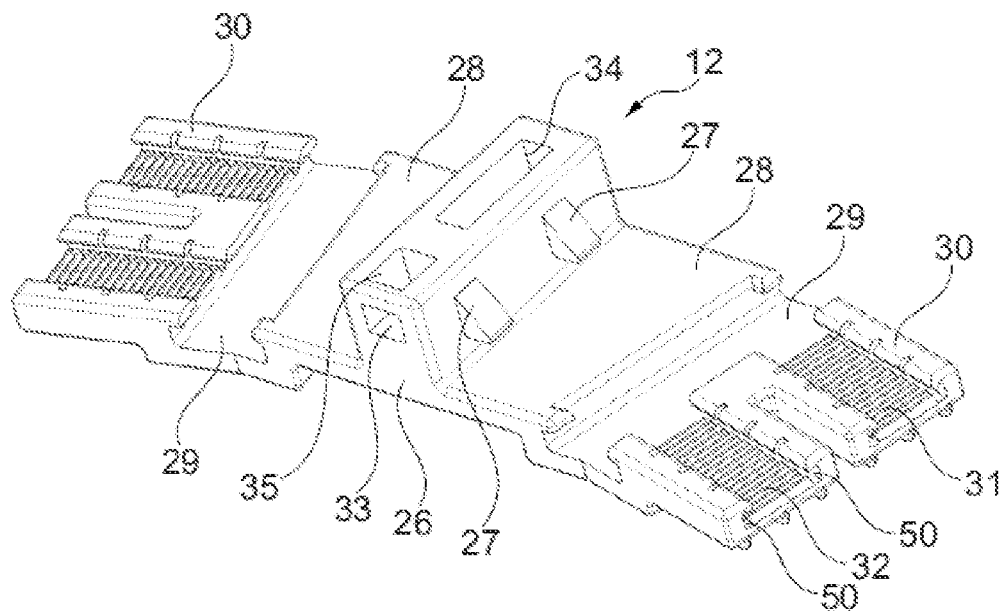
FIG. 14: shows a view of the fastening plate, illustrating the retaining tracks 31, 32 for the retaining slider.

A support web 24 is formed directly behind it along the circumference, which engages with a form fitting connection in a dedicated socket 35 in the region of a supporting frame 26 of the fastening plate 12 (see FIG. 14). Likewise, there is a further support web 25 located on the upper surface of the fastening element 21, which has a basically rectangular profile, and can be inserted into a dedicated socket 34 on the upper surface of the supporting frame 26 in a form fitting manner, which is part of the fastening plate 12. In this manner, the smaller, front trim element 9 is connected in a form fitting manner to the back (behind the spokes) fastening plate 12 via the retaining connection 63 in a retaining manner, and also via a form fitting plug-in connection of the support webs 24, 25 on the trim elements with a plug-in engagement in the sockets 34, 35 on the fastening plates. Consequently, high loads can be transferred because of this double connection. The retaining connection 63 is protected against twisting by the plug-in connections 24-35; 25-34 acting in parallel.

It can be seen in accordance with FIG. 6 that there are further support mounts 18 on the back surfaces of the decorative plates 13, which secure the retaining connections bearing only on the wheel, but which have only a slight load transferring effect. They are only for positioning the trim elements 10, when the decorative plates 13 are to be assembled thereon.

According to FIGS. 7 and 8, retaining tabs 19 with dedicated retaining hole 20 are formed on the lateral surfaces of the fastening element 21, which project away therefrom. According to FIG. 9, the retaining holes 20 bear on the dedicated retaining lugs 27 of the fastening plates 12, which are formed on the lateral surfaces of the supporting frame 26 of the fastening plates 12 according to FIG. 14.

The installation of the smaller trim elements 9 involves a form fitting and retaining connection, as can be clearly seen in FIG. 8.

Figure 9:
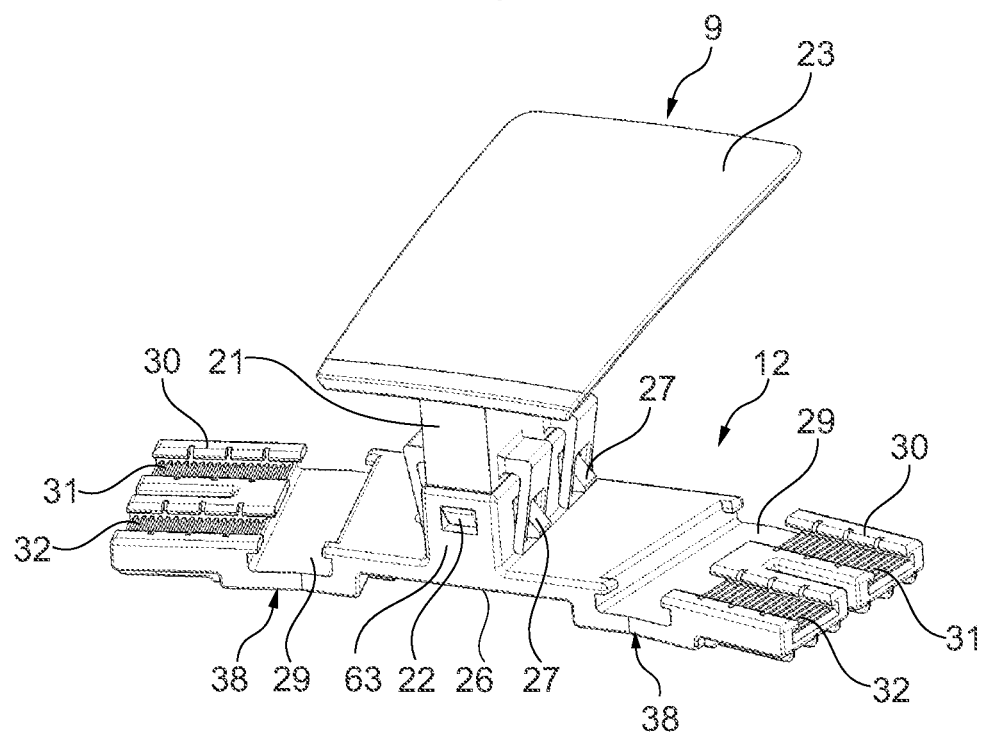
FIG. 9: shows an assembly scenario for installing the smaller trim element.

FIG. 9 also shows further features of the fastening plates 12, where it can be seen that there are retaining tracks 31, 32 that follow the circumference and are parallel to one another, which assume a mutual spacing to one another.

The invention is not limited to two parallel retaining tracks 31, 32. There can also be only one retaining track, or more than two retaining tracks.

In any case, retaining tracks 31, 32 are formed on the lateral surfaces of the fastening plates 12 following the circumference thereof, each of which forms a retaining element 30 with dedicated retaining sliders 40 that can only be displaced in one direction.

The two retaining tracks 31, 32 in FIG. 14 are delimited at the sides by guide grooves 50, in each of which a retaining slider 40 can be displaced and locked in place. It is also essential to the fastening plate 12 according to FIG. 9 that the retaining elements 30 are segmented on the inside, i.e. toward the central supporting frame 26, by radial grooves 29 lying therebetween in each case. These radial grooves 29 are each formed in a plate element 38, and form radial guide grooves, in which a locking slider 41 can be inserted and secured in place.

The radial grooves 29 can be either conical at the ends, in order to form a clamping lock for the locking sliders 41 that can be inserted therein, or they can be parallel to one another.

Figure 10:
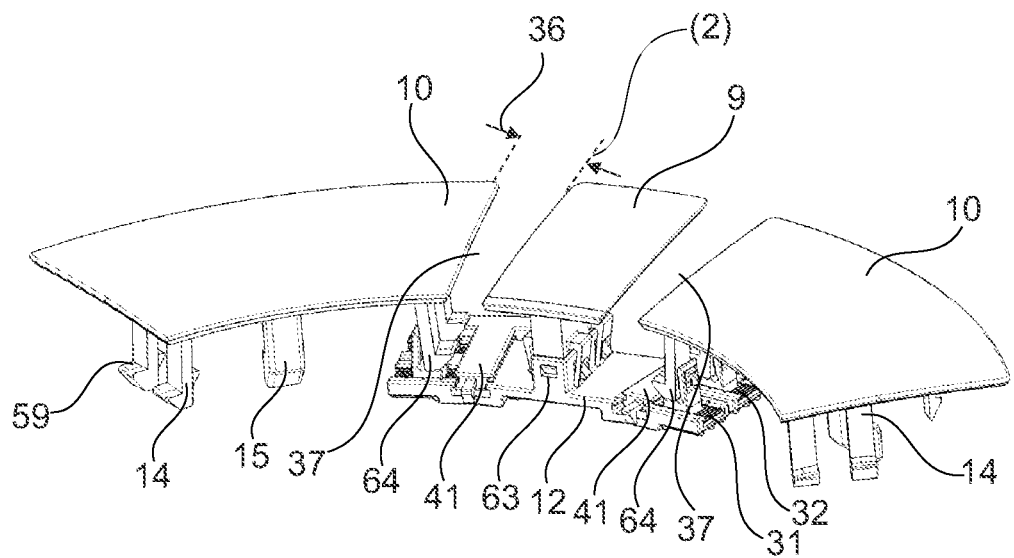
FIG. 10: shows an assembly scenario for installing the larger trim element in conjunction with a smaller trim element.

It can be seen in FIG. 10 that the spokes 2, 3 pass through the dedicated spaces between the edges of the respective trim elements 9, 10, and that the aforementioned locking sliders 41 are already installed.

Figure 21:
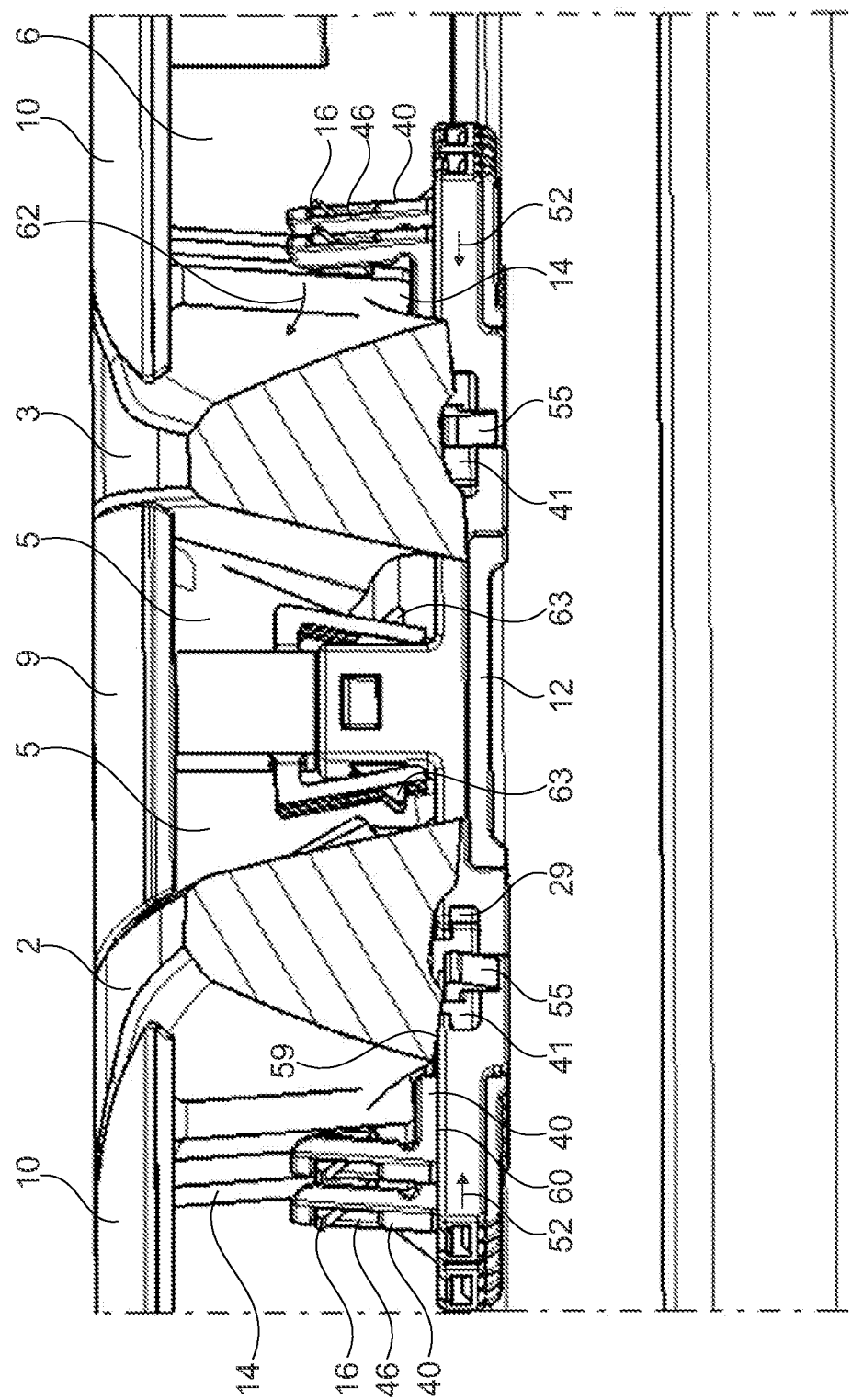
FIG. 21: shows a section of an assembly illustration, depicting how the segmented annular panel 11 is mounted on the spokes of an automobile wheel.

FIG. 10 also shows that the spacings 36 between the decorative elements do not need to be modified, because the actual form fitting connection takes place in conjunction with the aforementioned retaining slider connection on the undersurfaces of the spokes 2, 3 in the regions of the bearing surfaces 59 shown in FIG. 21.

Figure 11:
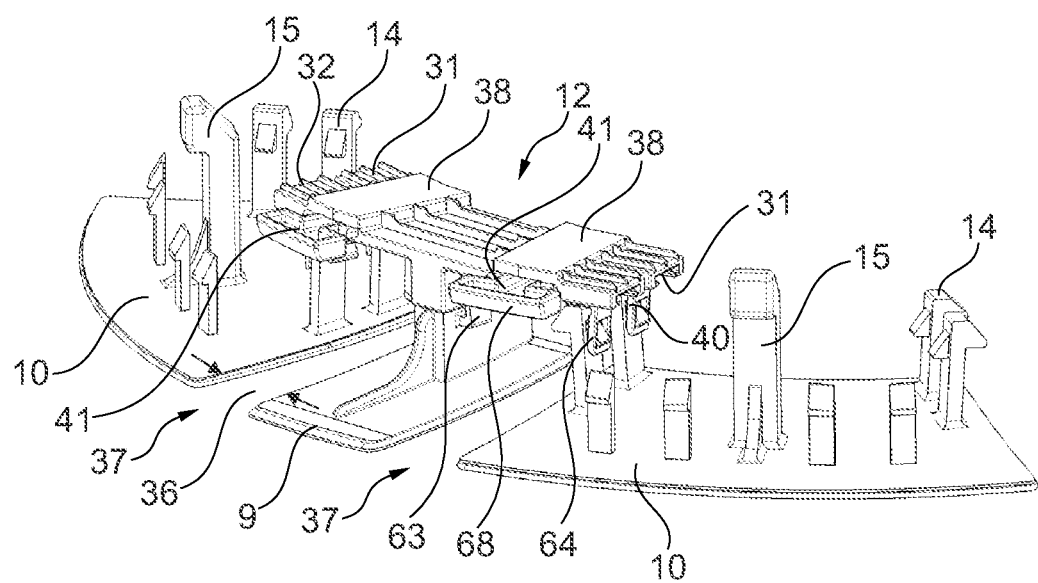
FIG. 11: shows the view according to FIG. 10 from the back, with additionally installed locking sliders.

FIG. 11 shows the illustration in FIG. 10, rotated 180°, where the locking sliders 41 that are already installed can be seen, the outer surfaces of which bear in a load transferring manner on a wheel flange, not shown in detail.

As a result, all radial centrifugal forces are accommodated in an optimal manner.

The corresponding stop surfaces 68 are shown in FIG. 11.

Figure 12:
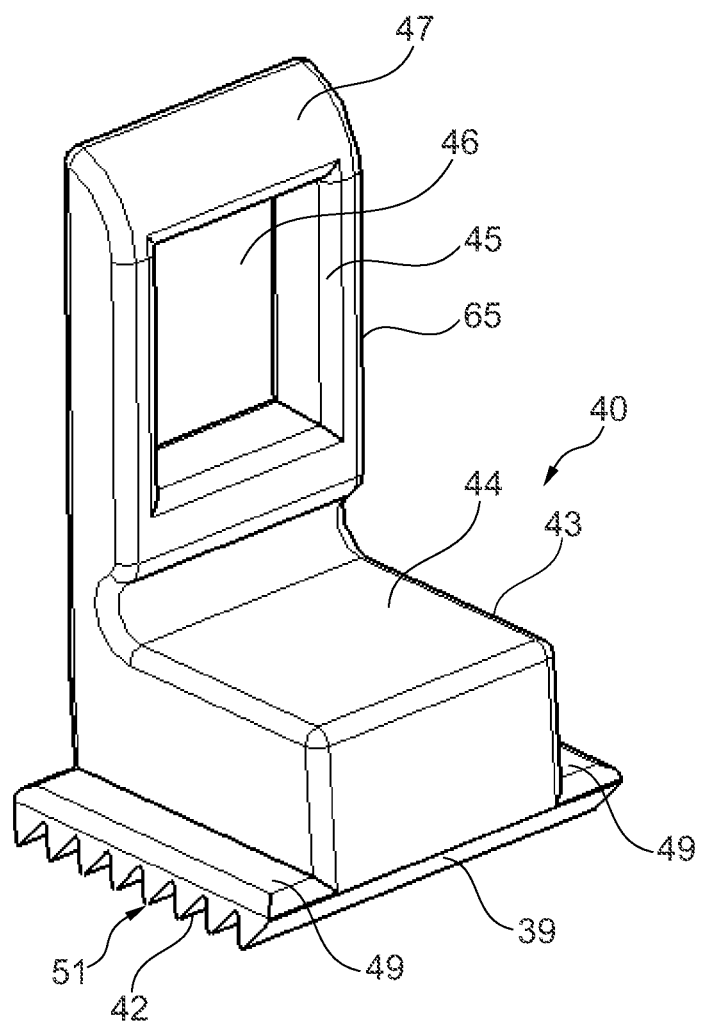
FIG. 12: shows the perspective view of a retaining slider.
Figure 13:
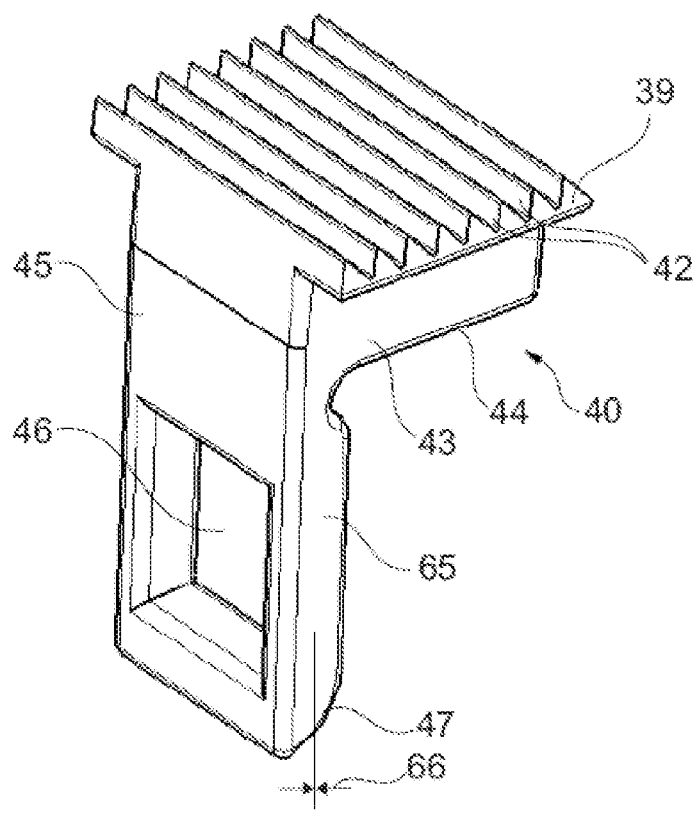
FIG. 13: shows a view of the locking slider rotated with respect to FIG. 12.

FIG. 12 shows a perspective view of a retaining slider 40, where it can be seen that retaining grooves 42 are formed in conjunction with retaining ribs 51 on the undersurface of a retaining plate 39, which are in the form of flukes.

The retaining plate 39 also has two lateral projections 49 extending beyond the outer periphery of the base element 43, and the upper surface of the base element 43 forms a stop surface 44.

As a result, the retaining plate 39 with the lateral projections 49 can be inserted into the dedicated guide grooves 50 in the region of the retaining tracks 30, 31.

A free arm is formed as an integral part of the base element 43, which forms a tightening arm, and is elastically flexible.

The retaining hole 46 for retaining the retaining lugs 16 of the retaining mounts 14 is formed in the region of the tightening arm 65. The free end of the tightening arm 65 is in the form of a curved diagonal surface 47.

On the whole, the tightening arm 65 thus forms a retaining tab 45, which shall be explained in greater detail below.

Figure 31:
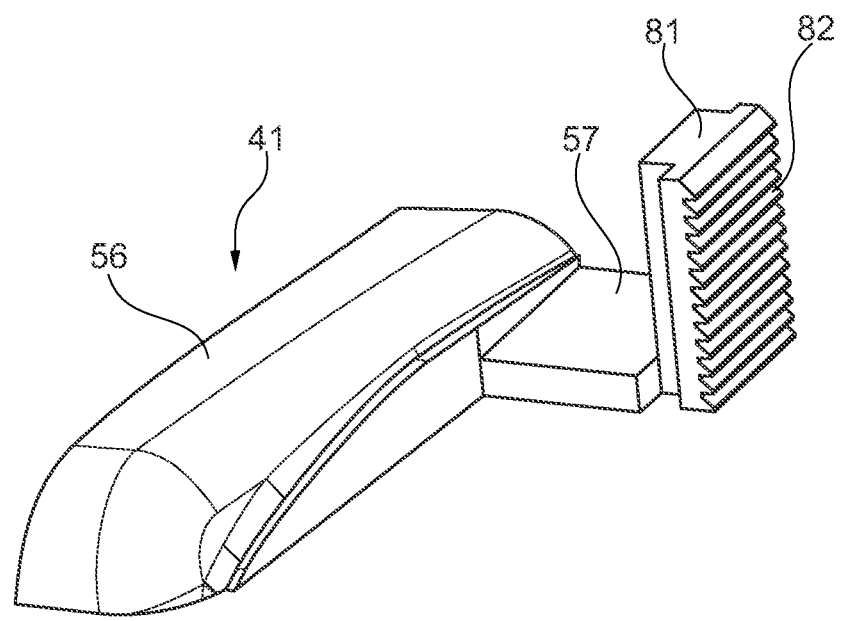
FIG. 31: shows the same illustration as FIG. 30, from another perspective.

FIG. 31 shows the same illustration as FIG. 12, and it can be seen therein that the tightening arm 65 can be bent to a certain extent in the direction of the arrow 66, with the aim of tensioning the retaining mount 14 in the direction of the arrow 62.

Figure 15:
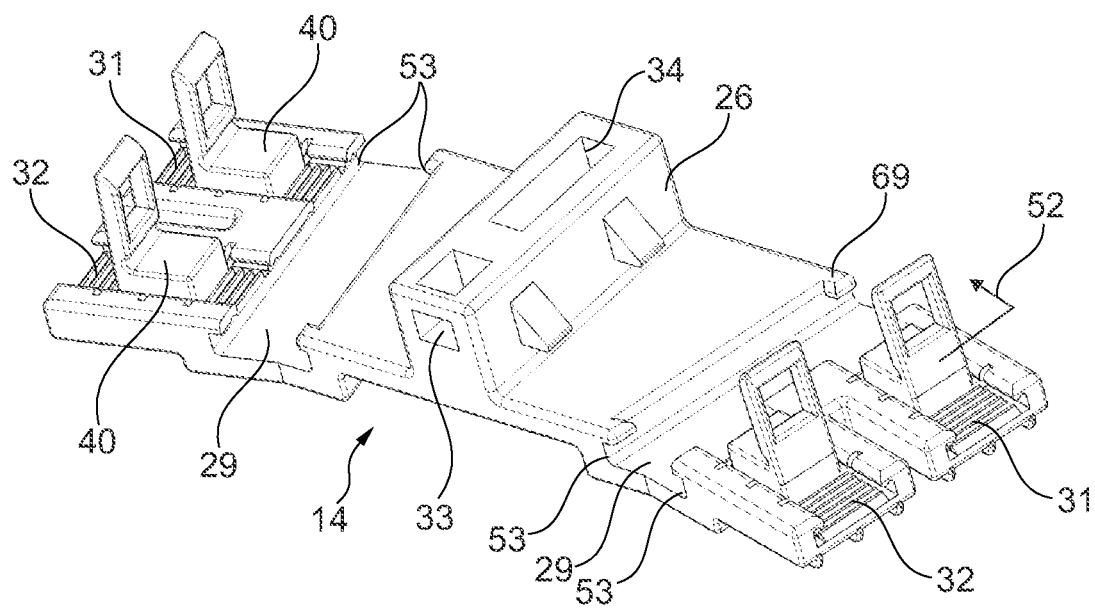
FIG. 15: shows the same illustration as FIG. 14, with the retaining sliders installed.

FIGS. 14 and 15 show further details of the retaining tensioning connection. It can be seen therein that the retaining sliders 40 are inserted into the retaining tracks 31, 32, and the retaining sliders can only be displaced in the direction of the arrow 52, but not in the other direction, because of the fluked formation of the retaining plate 39 with the associated retaining grooves 42.

Figures 16, 17:
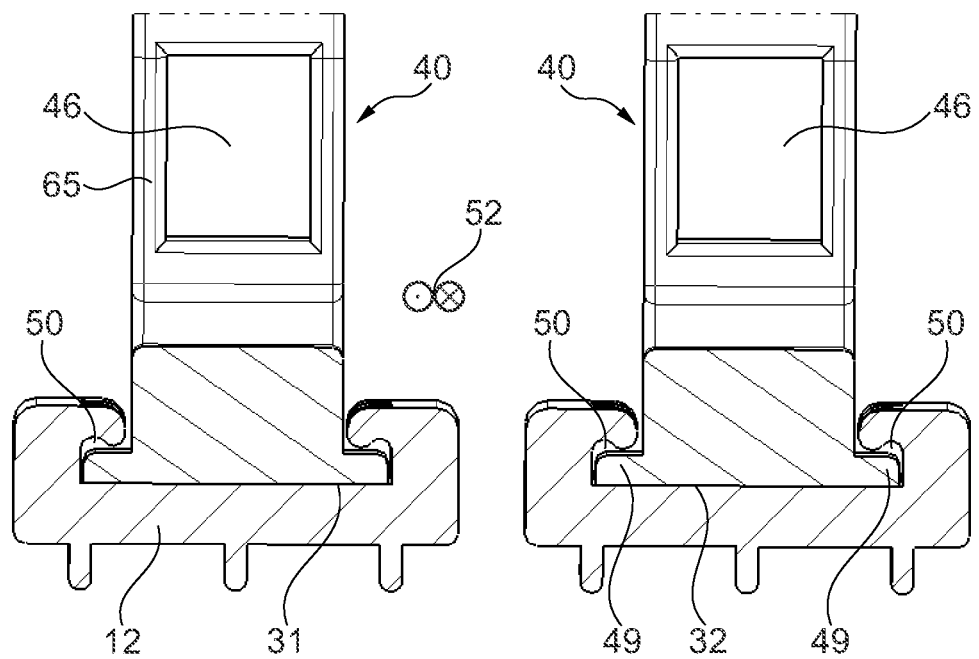
FIG. 16: shows the front view of the installed retaining slider.
FIG. 17: shows the same illustration as FIG. 16, with further details

FIGS. 16 and 17 show the displacement engagement of the retaining sliders 40 in the retaining tracks 31, 32, which can thus be displaced in the direction of the arrow 52.

Figure 18:
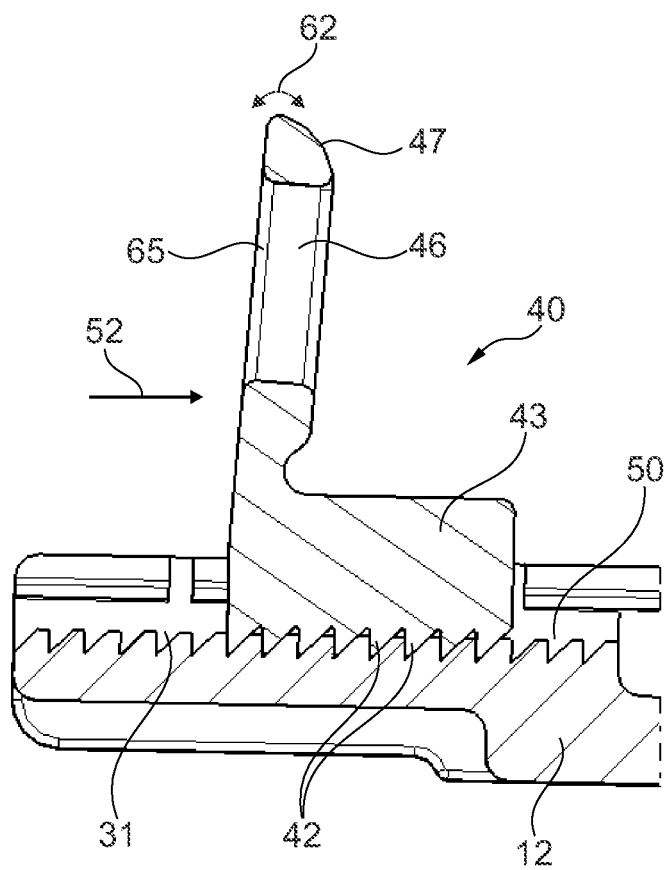
FIG. 18: shows a section cut through the guide for the retaining slider on the retaining track.

FIG. 18 shows a sectional view cut through the assemblies shown in FIGS. 16 and 17, where identical components are provided with the same reference symbols. It can be seen therefrom that these are fluked retaining grooves 42 with associated retaining ribs, which can be displaced in the direction of the arrow 52, but not in the other direction.

The tightening arm thus has a tensioning capacity in the direction of the arrow 62.

Figures 19, 20:
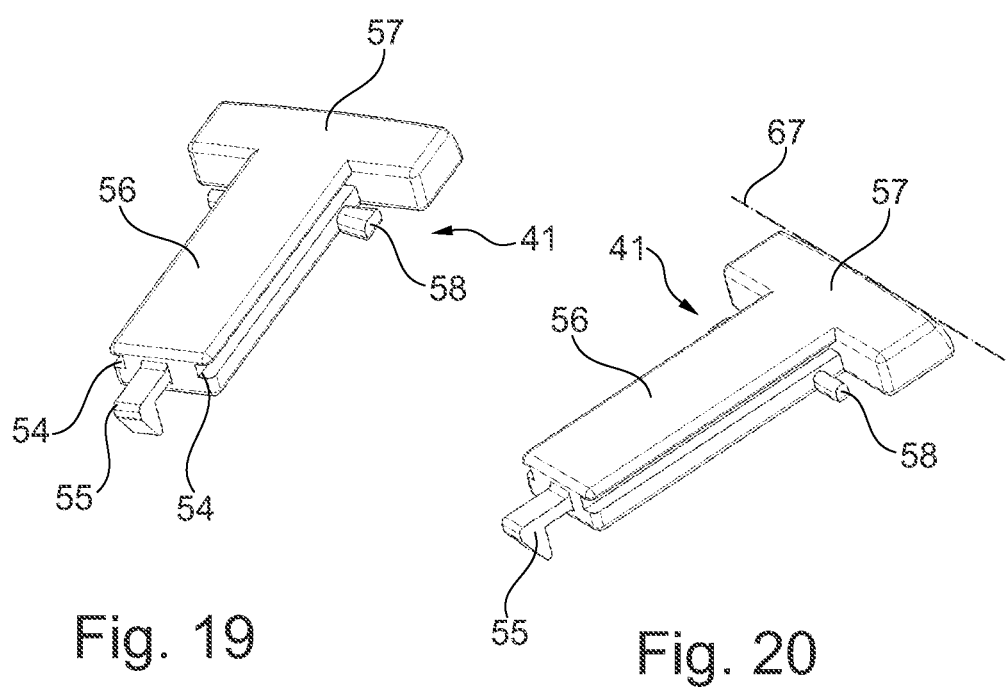
FIGS. 19, 20: show the perspective illustration of a locking slider.

A locking slider 41 is shown in FIGS. 19 and 20, which has a T-shaped profile, wherein the crossbar 57 bears with a dedicated bearing surface on the inner circumference of the wheel flange 67, and is braced there.

The leg 56 of the T-profile has a retaining hook on its front free end, which engages behind the fastening plate 12, as is shown in FIG. 21.

The locking slider 41 bears with the lateral support bolts 58 on an end support surface 69 on the fastening plate 12 (see FIG. 15).

This results in perfect, load transferring seating, because the crossbar 57 bears on the wheel flange 67 of the wheel 1, and the support bolt 58 bears on the outer surface or the supporting surface 69 of the fastening plate, and at the same time, the retaining hook engages behind the fastening plate 12.

FIG. 21 shows the retaining slider connection according to the invention, which is only used, however, with the larger trim elements 10.

The retaining mount 14 with the dedicated bearing surfaces 59 formed on the undersurfaces of the decorative plates 13 of the trim element 10 engages behind the undersurfaces of the spokes 2, 3, and bears in a force fitting manner thereon.

If there is any play there, or the spacing between the spokes 2, 3 is altered due to production tolerances, the retaining mount 14 can then be tightened in the direction of the arrow 62 using the retaining slider connection according to the invention. This takes place in that the retaining slider 40, which is connected to the retaining mount 14 with a retaining connection 64, is then displaced in a retaining manner on the fastening plate 12 along the circumference in the direction of the arrow 62, and thus bends the retaining mount 14 in the direction of the arrow 62 at the same time, such that the bearing surface 59 bears directly on the undersurface of the spokes 2, 3.

As a result, a form fitting and force fitting connection between the trim element 10 and the respective spokes 2, 3 is obtained, wherein the spokes themselves do not need to be clamped or penetrated, drilled, or mechanically altered in any way. This therefore forms a universal retaining slider connection, which is obtained solely through the retaining sliders 40 according to the invention, each of which can be displaced on the dedicated fastening plate 12 along the circumference, specifically in the direction of the arrow 52, and thus secure the retaining mounts 14 on the undersurfaces of the spokes 2, 3 in a force fitting an form fitting manner.

According to FIG. 21, it is sufficient when the smaller trim elements 9 are connected to the middle part of the fastening plate 12 with only one middle retaining connection 63 (as described above), wherein this retaining connection—as has been described based on FIG. 15—is in the form a retaining and form fitting connection.

Figure 22:
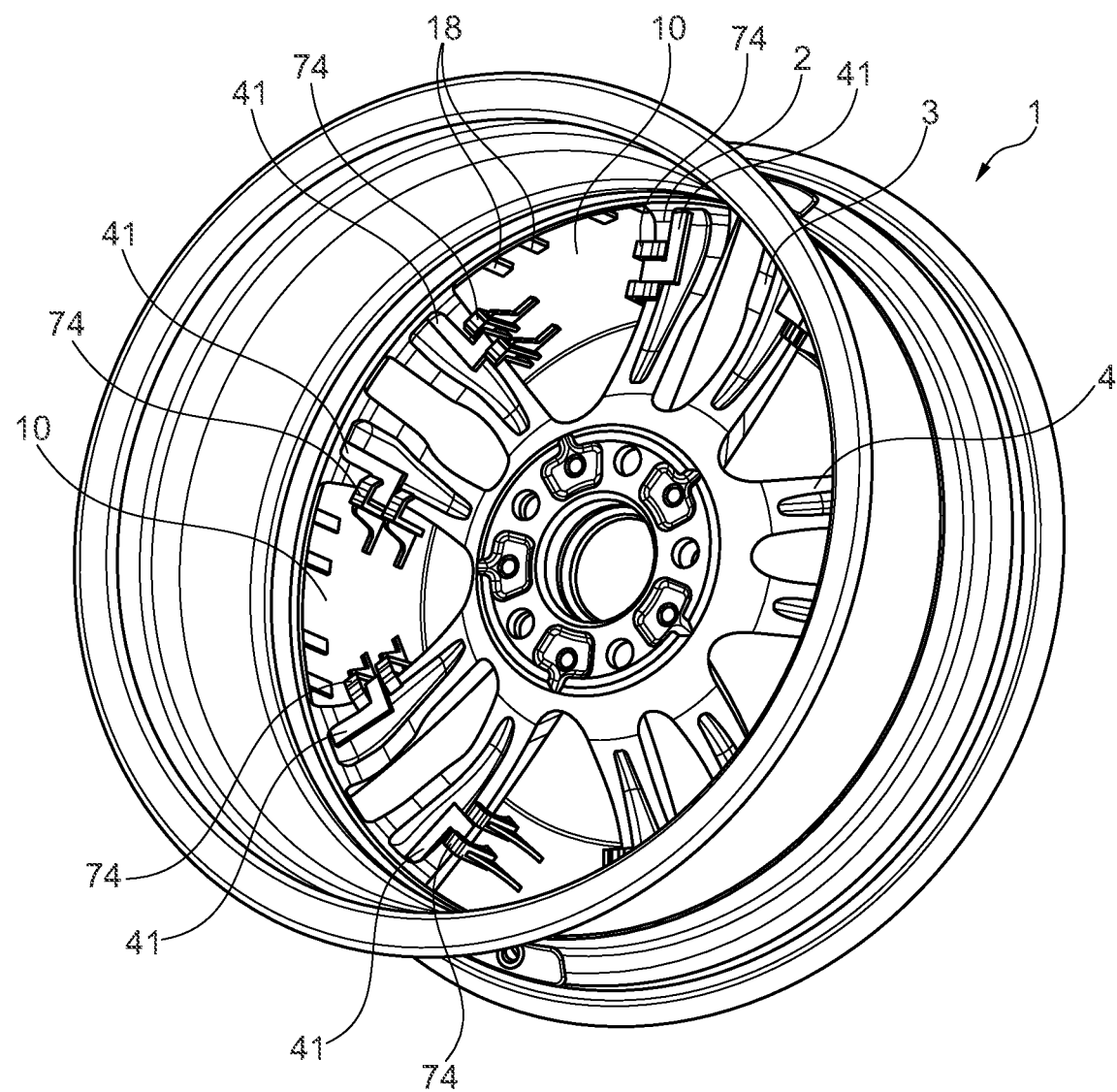
FIG. 22: shows a perspective, rear view of a motor vehicle wheel with trim elements on the front surface.

A further embodiment of a retaining connection is shown in FIGS. 22 to 31, which is simplified in comparison with the embodiment according to FIGS. 1 to 21, because the aforementioned fastening plate 12 is entirely eliminated, and instead, another embodiment of a locking slider 41 is provided, which bears directly on the back surface of the spokes 2-4 with is elongated base leg 56, as is shown in FIG. 22.

As a result, a simplified attachment to the spokes 2-4 is obtained.

The aforementioned support mounts 18 provide additional positional securing, particularly for positioning the trim element 10 for installation purposes, such that it is ensured that the trim element 10 bears on the inner circumference of the wheel ring.

As soon as this bearing is obtained, the novel retaining connection 74 can be established.

Figure 23:
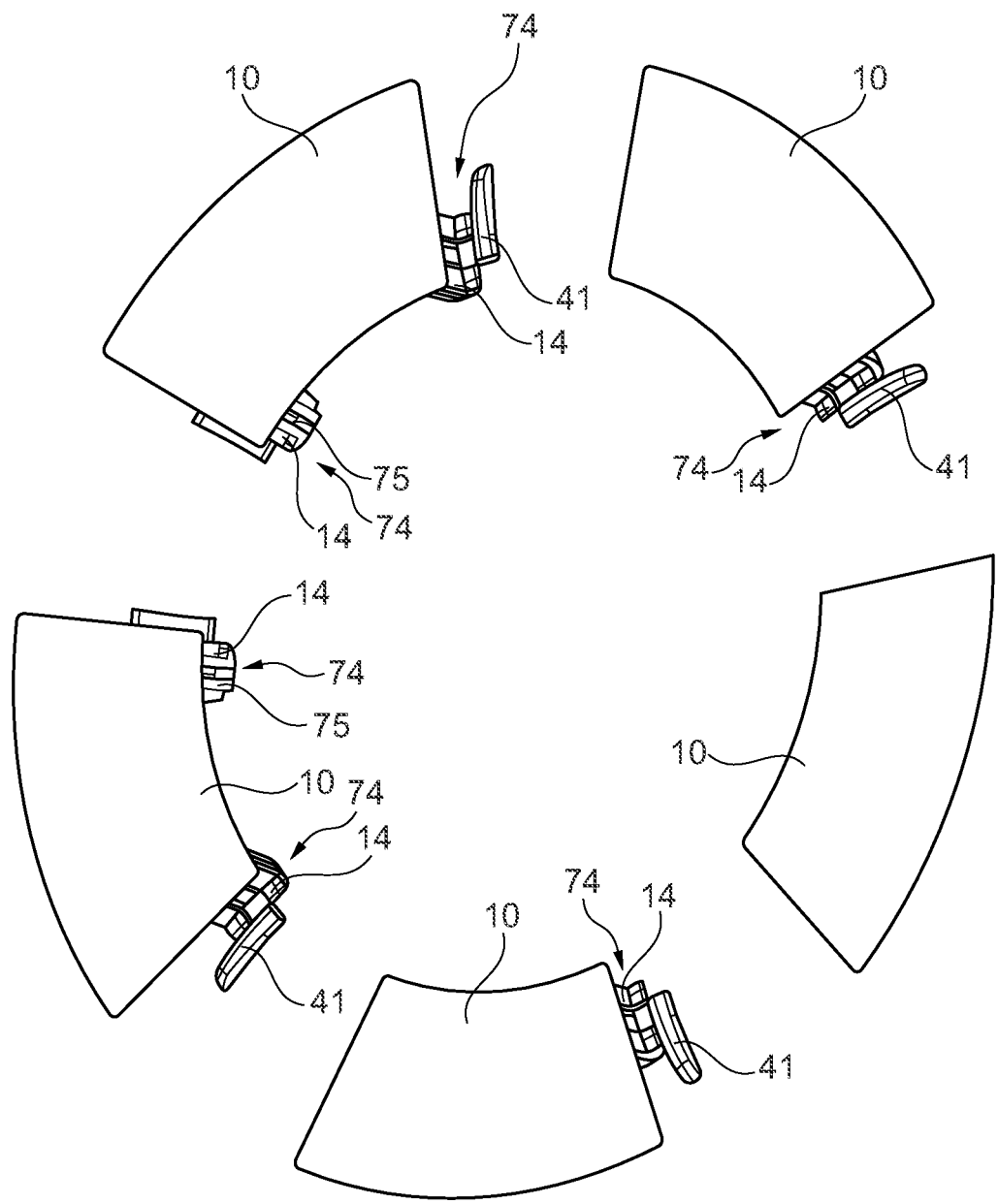
FIG. 23: shows an exploded view of the trim elements with retaining attachments according to the second embodiment.

According to FIG. 22 and FIG. 23, it is advantageous that the locking sliders 41 bear with their elongated base legs 56 on the back surfaces of the respective spokes 2, 3, 4, and can be adjusted vertically due to the novel retaining connection 74, meaning that the trim element can be securely clamped on the spokes 2-4 through the vertical adjustability of the locking sliders 41, and that this connection cannot be released because the fluked plates 76-78 used for this are only active in one direction, but block movement in the other direction.

The further retaining connection on the back surface of the wheel is obtained through the retaining mounts 14, which have retaining heads that bear on the spokes 2-4 and are locked in place there.

It is particularly advantageous that the retaining force of the hook heads of the retaining mounts 14 can be pre-set by means of a special formation of a retaining gap 72 that shall be explained below, with a retaining slider 80 that can be displaced therein in one direction, and the clamping effect of the hook heads of the retaining mounts 14 on the spokes can be further reinforced therewith.

This special feature shall be explained in greater detail below in conjunction with the retaining gap 72.

Figure 24:
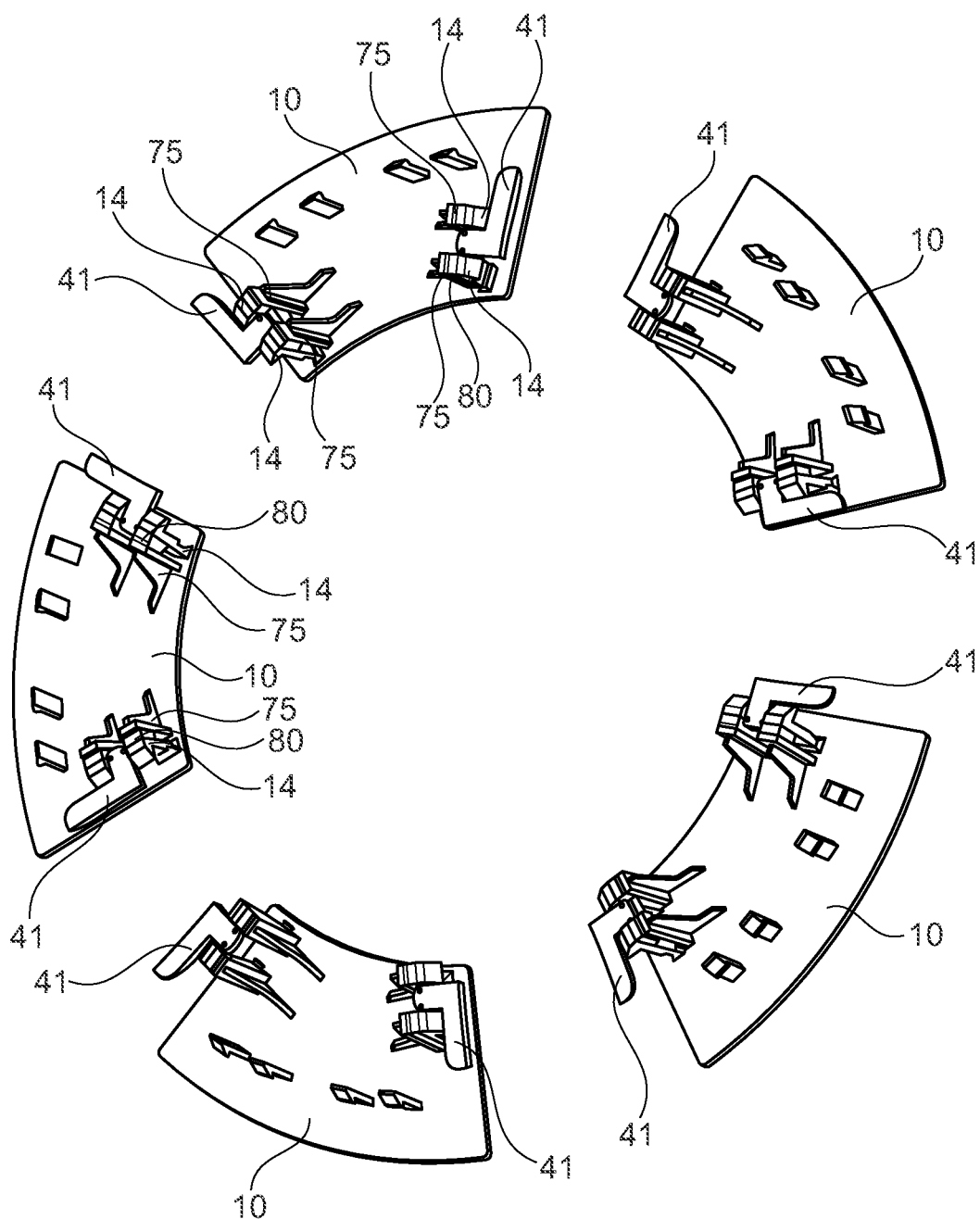
FIG. 24: shows the rear view of the assembly according to FIG. 23.

FIG. 24 shows the assembly of the retaining connection 74 from the back, in which, among other things, the retaining slider 80 is also shown, which is located in a conically tapered retaining gap 72 in the space between the retaining mount 14 for the retention thereof, and the counter retainer 75 that delimits the retaining gap 72 toward the back.

Figure 25:
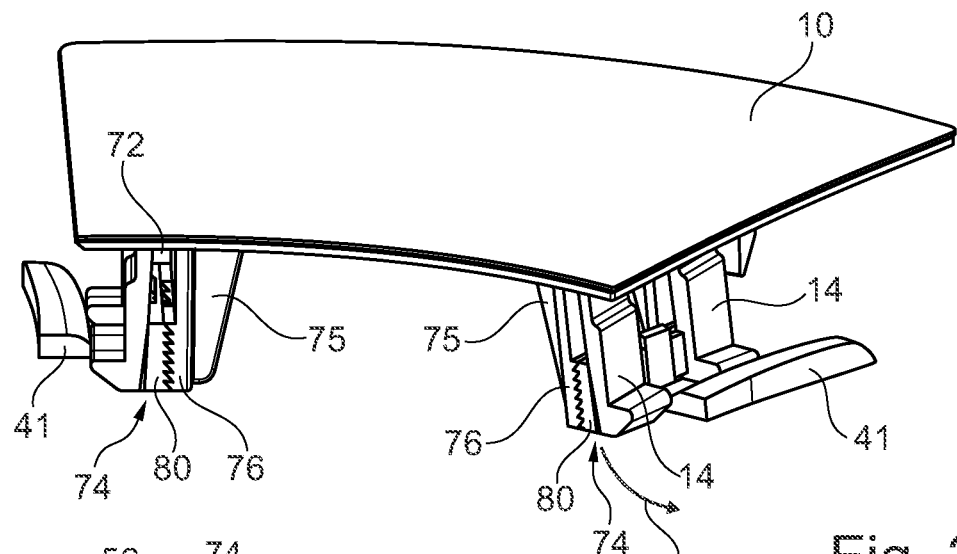
FIG. 25: shows the perspective view of a trim element with the retaining elements located thereon.
Figure 26:
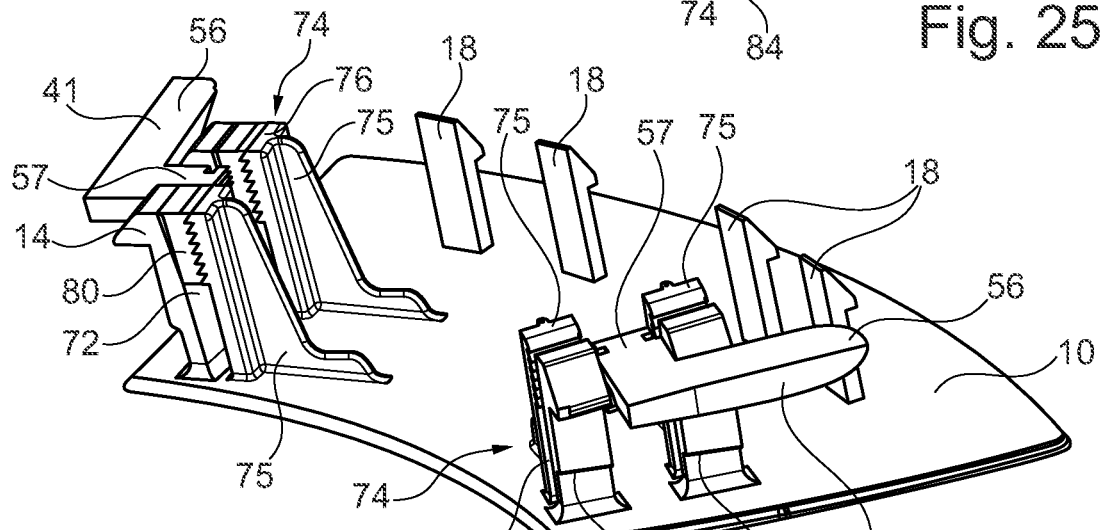
FIG. 26: shows the rear view of the assembly according to FIG. 25.
Figure 27:
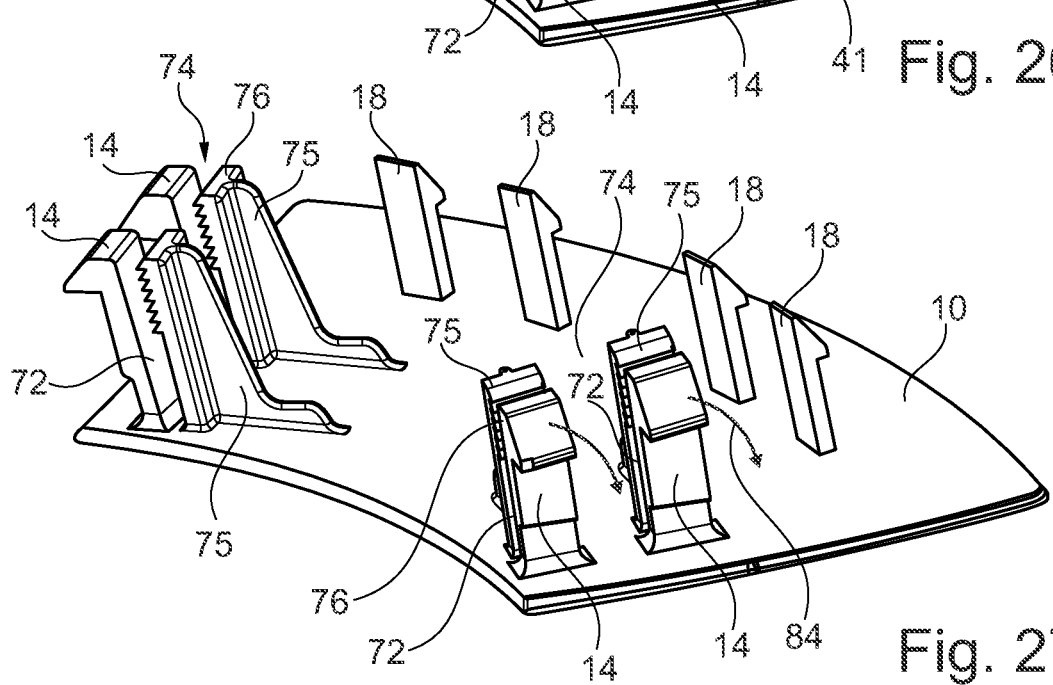
FIG. 27: shows the same illustration as FIG. 26, but without the retaining slider and the locking slider.

Further details can be derived from FIGS. 25 to 27.

It is advantageous that the retaining connection 74 according to the invention takes place in the spaces between parallel pairs of spaced apart retaining mounts 14, opposite which and at a slight spacing thereto are two parallel counter retainers 75 forming an identical reciprocal spacing.

The components 14 and 75 form the conically tapered retaining gap 72 between them in which a retaining slider 80 can only be displaced in one direction, specifically toward the plane of the trim element 10, but is blocked in the other direction.

It is advantageous that according to FIGS. 25 and 26, the retaining slider 80 has a socket 79 (see FIGS. 28 and 29) in which the locking slider 41 engages with a dedicated retaining plate 81 and can only be displaced there in the direction of the arrow 83, but is blocked in the opposite direction.

As in the first exemplary embodiment, the locking slider 41 is composed of the longer base leg 56, which is connected via a crossbar 57 at a right angle thereto to the retaining plate 81 which has a retaining surface 82 thereon.

Figure 28:
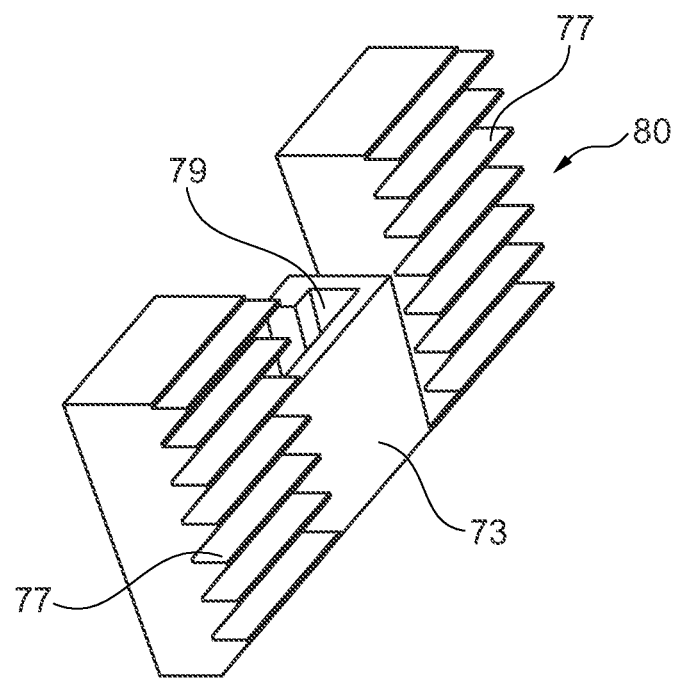
FIG. 28: shows a perspective view of a retaining slider from the front.
Figure 29:
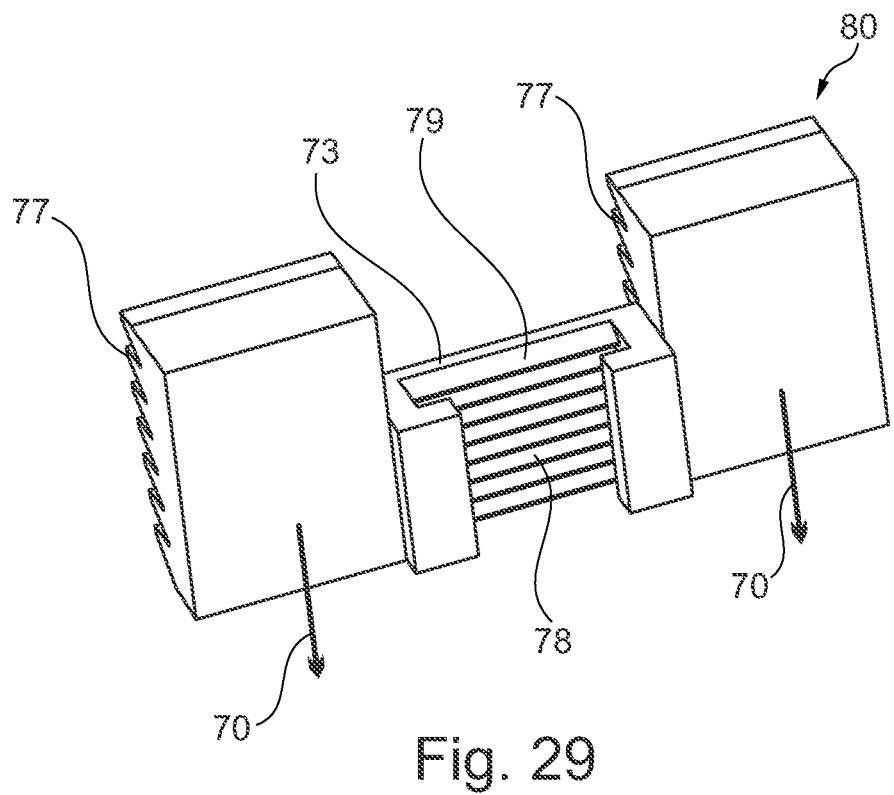
FIG. 29: shows the retaining slider according to FIG. 28 from the back.
Figure 30:
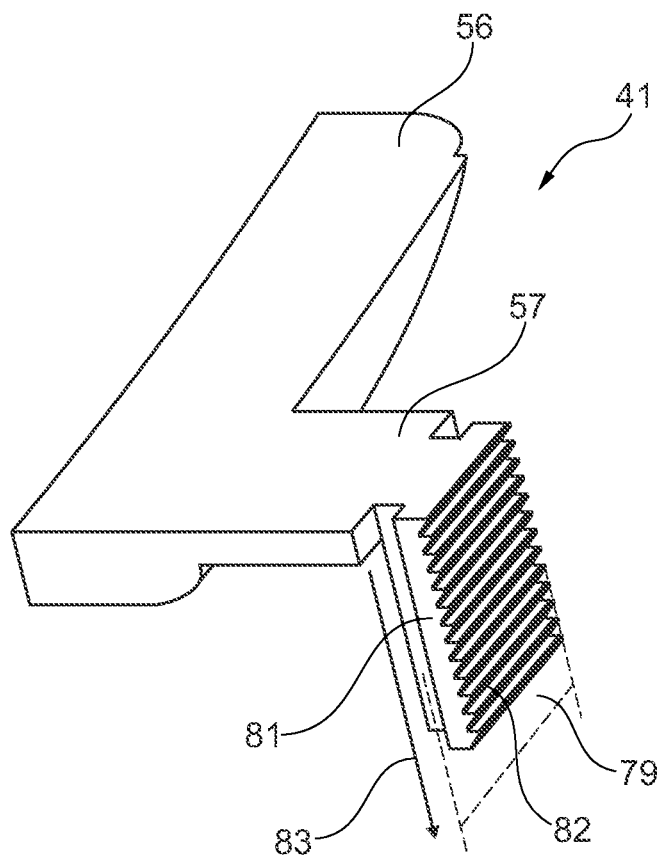
FIG. 30: shows a perspective view of a novel locking slider.

As is shown schematically in FIG. 30, the retaining plate 81 is received with the retaining surface 82 in the socket 79 of the retaining slider 80 in accordance with FIGS. 28, 29 such that it can be displaced in one direction. This takes place in that there is also a dedicated fluked plate 78 in the socket 79, which interacts with the retaining surface 82 of the retaining plate 81.

The socket is indicated schematically by lines in FIG. 30, in order to show that the retaining plate can only be displaced downward in the socket, in the direction of the arrow 83.

When displaced downward in the direction of the arrow 83, the long leg 57 of the locking slider 41 thus bears in a load transferring manner on the back surfaces of the spokes 2-4, as is shown in FIG. 22.

It is also advantageous that the retaining slider 80 according to FIGS. 28 and 29 is made of a basically U-shaped element, which forms two lateral parallel fluked plates 77, which are connected to one another by a middle part, in which the aforementioned socket 79 is located.

The aforementioned fluked plate 79 is located on the socket 79.

The fluked plates 77 adjoining the middle part 73 then engage laterally in the two parallel retaining gaps 72, each of which are formed—see FIGS. 26 and 27—in the space between opposing the mounts 14, 75 that are attached thereto at one side.

It can thus be derived from FIG. 29 that the locking slider 80 on the whole can be displaced in the direction of the arrow 70 in the respective pairs of parallel retaining gaps 72, and—because the retaining gap tapers conically downward—when the retaining slider 80 is displaced toward the plane of the trim element 10, the respective retaining mount 14 is bent elastically forward, in the direction of the arrow 84, and as a result, this downward displacement of the retaining slider 80 results in a reinforcement of the retaining connection, because the two retaining mounts 14 forming the retaining connection are pivoted in the direction of the arrow 84, and locked in place with the retaining slider.

In addition, the locking slider 41 can be displaced in the direction of the arrow 83 in its socket 79 in conjunction with the fluked plate 78 formed therein, which likewise results in a stabilization of the bearing of the locking slider 41 on the back surfaces of the spokes.

It should also be noted that there is a fluked plate 76 located on each of the counter retainers 75 forming mounts, at the side where the retaining gap 72 is located.

The back surfaces of the surfaces of the retaining mounts 14 forming the retaining gap can be smooth.

LIST OF REFERENCE SYMBOLS 1 automobile wheel
2 spoke
3 spoke
4 spoke
5 space (small)
6 space (large)
9 trim element (small)
10 trim element (large)
11 annular panel
12 fastening plate
13 decorative plate
14 retaining mount (lateral)
15 retaining mount (middle)
16 retaining lug
17 stop surface
18 supporting mount
19 retaining tab
20 retaining hole
21 fastening element 22 retaining mount
23 decorative plate (small)
24 support web (small)
25 support web (large)
26 supporting frame
27 retaining lug
28 plate element
29 radial groove
30 retaining element
31 retaining track
32 retaining track
33 retaining hole
34 socket (large)
35 socket (small)
36 decorative element spacing
37 receiving space
38 plate element
39 retaining plate (on 40)
40 retaining slider
41 locking slider
42 retaining groove (on 40)
43 base element
44 stop surface
45 retaining tab
46 retaining hole
47 diagonal surface
49 projection (for 50)
50 guide groove (for 49)
51 retaining rib
52 direction of arrow
54 guide groove
55 retaining hook (on 41)
56 base leg
57 crossbar
58 supporting bolt
59 stop surface (on 14)
60 tightening surface (horizontal)
62 direction of arrow
63 retaining connection (middle)
64 retaining connection (lateral)
65 tightening arm
66 direction of arrow
67 wheel flange
68 stop surface
69 supporting surface
70 direction of arrow
72 retaining gap (conical)
73 middle part
74 retaining connection
75 counter retainer
76 fluked plate (on 75)
77 fluked plate (on 80)
78 fluked plate (on 80)
79 socket (on 80)
80 retaining slider
81 retaining plate (on 41)
82 retaining surface
83 direction of arrow
84 direction of arrow

The invention claimed is:

1. A decorative trim panel on an automobile wheel, the decorative trim panel comprising:
   at least one plate-shaped trim element that at least partially covers a visible side of the automobile wheel; and
   a retainer operable to secure the plate-shaped trim element on at least one spoke of the wheel, the retainer comprising:
   a fastening plate; and
   a connector operable to attach the plate-shaped trim element to the fastening plate with the fastening plate bearing a load on a back surface of the at least one spoke and the plate-shaped trim element at least partially covering the visible side of the automobile wheel.

2. The decorative trim panel according to claim 1, wherein a first part of the connector comprises a retaining slider displaceable along the circumference of the wheel and securable to the fastening plate.

3. The decorative trim panel according to claim 2, wherein a second part of the connector comprises at least one retaining mount formed on an undersurface of the plate-shaped trim element, the retaining mount securable to a retaining hole in the retaining slider.

4. The decorative trim panel according to claim 1, wherein the connector can be tightened.

5. The decorative trim panel according to claim 2, wherein the fastening plate comprises a fastening groove in a retaining track and wherein the plate-shaped trim element comprises a retaining mount having a retaining lug, wherein the retaining slider is displaceable and lockable in place at a mount in the fastening groove in the retaining track of the fastening plate, the retaining slider comprises a free arm forming an elastic flexible tightening arm that forms a retaining hole for the engagement of the retaining lug on the retaining mount of the plate-shaped trim element.

6. The decorative trim panel according to claim 5, wherein the connector further comprises a locking slider.

7. The decorative trim panel according to claim 1, wherein the at least one plate-shaped trim element comprises a smaller trim element, and wherein the connector comprises a second retaining connection between the smaller trim element and the fastening plate.

8. The decorative trim panel according to claim 1, wherein the at least one plate-shaped trim element comprises a larger trim element comprising a stop surface bearing on a wheel flange with at least one retaining mount connecting the stop surface to the middle of the larger trim element.

9. The decorative trim panel according to claim 1, wherein the assembly and removal of the at least one plate-shaped trim element takes place without tools in conjunction with the fastening plate engaging behind the at least one spoke.

10. The decorative trim panel according to claim 1, wherein the plate-shaped trim element comprises a retaining element formed on the back surface of the plate-shaped trim element, the retaining element comprising a retaining mount on a lateral wall of the retaining element, the retaining mount facing in the direction of the circumference and having a dedicated retaining hook, which engages in a retaining hole on the inner surface of the fastening plate facing in the radial direction of the wheel.

11. The decorative trim panel according to according to claim 10, wherein the at least one plate-shaped trim element comprises a smaller trim element, and wherein the smaller trim element comprises a profiled support web formed on a back surface of the smaller trim element, and wherein the fastening plate comprises a dedicated socket, the profiled support web is pluggable into the dedicated socket.

12. A decorative trim panel on an automobile wheel, the decorative trim panel comprising:
   at least one plate-shaped trim element that at least partially covers a visible side of the automobile wheel, and;

a retainer operable to secure the plate-shaped trim element on at least one spoke of the wheel, the retainer comprising:
    at least one locking slider positionable to bear a load on a back surface of the at least one spoke when secured to the at least one plate-shaped trim element; and
    a connector operable to connect the locking slider to the at least one plate-shaped trim element at vertically adjustable positions.

13. The decorative trim panel according to claim 12, wherein the connector comprises a plurality of retaining mounts that are spaced apart on a back surface of the plate-shaped trim element and secured in place at one side, the retaining mounts forming a retaining gap with a plurality of counter retainers that are substantially parallel to the retaining mounts, wherein a retaining slider is received in the retaining gap such that the retaining slider is adjustable vertically and displaceable therein, the retaining slider connected to the at least one locking slider to position the locking slider on the at least one spoke.

14. The decorative trim panel according to claim 12, wherein the retaining gap is conical, and a displacement of the locking slider in the retaining gap results in a bending of one of the plurality of retaining mounts that reinforces an attachment to the at least one spoke.

15. The decorative trim panel according to claim 12, wherein the locking slider can only be displaced in one direction in the retaining gap, and is blocked in the opposite direction.

* * * * *